United States Patent [19]

Dickinson

[11] Patent Number: 5,485,728
[45] Date of Patent: Jan. 23, 1996

[54] EFFICIENT UTILIZATION OF CHLORINE AND MOISTURE-CONTAINING FUELS

[75] Inventor: Norman L. Dickinson, Monte Sereno, Calif.

[73] Assignee: EnerTech Environmental, Inc., Atlanta, Ga.

[21] Appl. No.: 152,796

[22] Filed: Nov. 15, 1993

Related U.S. Application Data

[63] Continuation-in-part of Ser. No. 763,000, Sep. 20, 1991, Pat. No. 5,261,225, which is a continuation of Ser. No. 388,069, Jul. 21, 1989, Pat. No. 5,050,375, which is a continuation-in-part of Ser. No. 123,280, Nov. 20, 1987, abandoned, which is a continuation-in-part of Ser. No. 813,486, Dec. 26, 1985, Pat. No. 4,714,032.

[51] Int. Cl.⁶ ............................................. F01K 17/00
[52] U.S. Cl. ............................ 60/648; 60/649; 60/655; 60/676; 110/346; 122/2
[58] Field of Search ........................... 60/648, 649, 655, 60/673, 676; 110/346, 347; 48/197 A, 197 R; 208/427; 122/2

[56] References Cited

U.S. PATENT DOCUMENTS

| | | |
|---|---|---|
| 4,126,519 | 11/1978 | Murray . |
| 4,192,653 | 3/1980 | Giannetti et al. . |
| 4,414,813 | 11/1983 | Knapp ............................... 60/655 |
| 4,579,562 | 4/1986 | Tarman et al. . |
| 4,762,527 | 8/1988 | Beshore et al. . |
| 5,132,007 | 7/1992 | Meyer et al. ....................... 208/427 |
| 5,188,739 | 2/1993 | Khan et al. . |
| 5,188,740 | 2/1993 | Khan . |
| 5,188,741 | 2/1993 | Zang et al. . |
| 5,211,723 | 5/1993 | Khan . |
| 5,211,724 | 5/1993 | Khan et al. . |
| 5,217,625 | 6/1993 | Khan et al. . |
| 5,234,468 | 8/1993 | Khan . |
| 5,234,469 | 8/1993 | Khan et al. . |
| 5,264,009 | 11/1993 | Khan . |
| 5,266,085 | 11/1993 | McMahon et al. . |
| 5,273,556 | 12/1993 | McMahon et al. . |
| 5,292,442 | 3/1994 | Khan et al. . |

*Primary Examiner*—Stephen F. Husar
*Attorney, Agent, or Firm*—Townsend and Townsend and Crew

[57] ABSTRACT

Disclosed is a method and system for recovering energy from low-grade fuels such as industrial, municipal and agricultural waste, low-grade carbonaceous fuels such as lignite and similar solid fuels in which the fuel is comminuted into small particles and slurried in water. The alkali content of the slurry is adjusted to be at least about equal to the chemical equivalent of the halogen content of the slurry and, following pressurization of the slurry, it is heated sufficiently so that the substantial portion of chemically bound oxygen in the fuel separates therefrom as carbon dioxide, leaving a slurry including char particles and dissolved impurities such as halogen salts. The char particles are removed from the slurry and reslurried with just enough halogen-free water to provide the slurry with the needed viscosity to maximize the energy density thereof. The char particles are then reacted with air at a temperature below their ignition value to convert the fuel value of the low-grade fuel into thermal energy which is then further used, for example, to drive a turbine.

45 Claims, 5 Drawing Sheets

EFFICIENT UTILIZATION OF CHLORINE AND MOISTURE-CONTAINING FUELS

CROSS-REFERENCE TO RELATED APPLICATIONS

This application is a Continuation-in-Part of application Ser. No. 763,000, filed Sep. 20, 1991 (now U.S. Pat. No. 5,261,255), which is a Continuation of application Ser. No. 388,069, filed Jul. 21, 1989 (now U.S. Pat. No. 5,050,375), which is a Continuation-in-Part of abandoned application Ser. No. 123,280, filed Nov. 20, 1987, which was a Continuation-in-Part of application Ser. No. 813,486, filed Dec. 26, 1985 (now U.S. Pat. No. 4,714,032). It is also related to application Ser. No. 294,424, filed Jan. 9, 1989 (now U.S. Pat. No. 4,898,107), which is a Continuation-in-Part of abandoned application Ser. No. 100,531, filed Sep. 24, 1987, which was a also a Continuation-in-Part of application Ser. No. 813,486 (now U.S. Pat. No. 4,714,032).

BACKGROUND OF THE INVENTION

This and the referenced inventions are addressed to the related national problems of energy security and air quality. In particular, it is addressed to potential domestic energy resources which are not utilized, or under utilized, because of impurities, notably moisture and chlorine.

Fuels (with the exception of nuclear fuels) are said to be carbonaceous, i.e., having a carbon skeleton. The fluid fuels: oil and gas, are essentially mixtures of hydrocarbons whereas solid fuels have considerable oxygen in their molecular structure.

Coals are "ranked" according to their geological age. Those of high rank (oldest) have high carbon and low oxygen contents, little affinity for water, and are mineral-like. Anthracite and bituminous coals are considered high rank. As rank (age) decreases coals have decreasing carbon and increasing oxygen contents and affinity for water, and become more fibrous. Sub-bituminous and lignites are low rank coals. Although not called coal, peat is a fossil fuel still lower in age or rank.

Sub-bituminous coals and lignites are important commercial fuels, usually mined at low cost. (Powder River Basin sub-bituminous has another attractive feature—it is low in sulfur and in considerable demand by utilities having difficulty meeting sulfur dioxide emission regulations.) However, their high moisture contents, and correspondingly low heating values, make them expensive to ship to market and inefficient to burn.

Heating values are misleadingly reported as though water were only a diluent. Besides dilution, additional energy is wasted evaporating it, making this impurity an even greater drawback than is apparent, especially for solid fuels shipped at high expense.

Still further down the ranking scale are a variety of organic wastes and by-products (biomass), whose aggregate dry heating value, although not usually counted as an energy resource, could make an appreciable contribution to the domestic supply. Among these are Municipal Solid Waste, Industrial Wastes, Construction and Demolition Wastes, Paper Mill and Sewage Sludges. To these can be added the variety of woody or cellulosic by-products of agriculture and forestry, and industry based upon them. Compared with even lowest ranked fossil fuels, they have lower contents of carbon and higher contents of oxygen. Most are also fibrous and normally associated with substantial water.

Inventors and entrepreneurs have responded to the moisture/heating value drawback of low rank coals by putting forward a variety of carbonization processes, in which moisture and oxygen are driven off by heat. In other words, the carbonaceous raw material has been enriched in carbon. Although heating value is improved, the product tends to be troubled by dusting and spontaneous combustion. By product water, heavily contaminated with complex organic chemicals, presents a difficult disposal problem (addressed in my U.S. Pat. No. 5,000,099). These carbonizations, moreover, handle and process raw material and product as solid fuels, through a sequence of solids moving, heating, cooling, crushing, screening, etc. steps, at considerable expense and opportunity for pollution and loss.

In contrast to the ease, economy and cleanliness with which fluid fuels are pipelined around the country, solids are burdened with open mechanical excavators, conveyors, bulldozers, crushers, hoppers, railroad cars, pilers, reclaimers, grinders, etc. all of which require labor and create noise, dust, loss and polluted runoff. The existing mechanical culture of solid fuels utilization needs lump fuel of limited size range. In crushing oversize material to conform, considerable undersized must be rejected. These "fines" have little market and comprise not only a loss of material but an environmental debit.

The DOE and private entrepreneurs have tried to address the often overlooked form penalty, which solid fuels have to bear relative to fluid fuels: oil and gas. One of the most extensive of such attempts has comprised programs to convert coal into a liquid slurry fuel, called Coal-Water-Fuel (CWF), which has been successfully fired in boilers and furnaces designed for oil. Specially prepared CWFs have also been fired in experimental diesel engines and gas turbine combustors. Unfortunately, most coals require extensive beneficiation and expensive additives, making the cost of energy, in CWF form, roughly double that of the coal from which it is made. At the time of this application world oil prices are so low that this technically feasible substitution is uneconomic.

High rank coals (anthracite and bituminous) can be ground and slurried to a pumpable solids concentration of 50% or higher. As rank decreases (sub-bituminous toward lignite), there is a deterioration in slurryability. Poor slurrying characteristics of low rank and waste fuels are associated with their fibrous and hydrophillic nature. However, it was pointed out in my U.S. Pat. No. 4,380,960 that a slurry of a hydrophillic fuel can be concentrated by heating to a temperature at which molecular rearrangement occurs, with splitting off of carbon dioxide and water, resulting in a less hydrophilic and fibrous fuel (char) for which the maximum pumpable concentration is considerably increased. I have called this process "Slurry Carbonization".

The Energy and Environmental Research Center (EERC) of the University of North Dakota has extensively studied the slurry carbonization (which they call Hydrothermal Treatment or Hot Water Drying) of North Dakota and other lignites. In a continuous pilot unit EERC, under contract with the DOE, has carbonized a slurry of low ash sub bituminous coal which, after concentration, the Allison Division of General Motors used successfully to fuel a commercial-scale gas turbine with solid fuel for the first time.

The EERC has also studied the slurry carbonization of such woody by-products as sawdust, obtaining around 300% improvement in the concentration (and energy density) of pumpable slurries.

Compounding coal's form handicap in the energy market are its impurities. A variable content of ash inflates shipping, emissions control, maintenance and disposal costs. Moisture is costly to ship and lowers boiler efficiencies. Sulfur and nitrogen contents are considered responsible for acid rain and require expensive control devices to meet clean air standards. Chlorine in some coals causes expensive boiler tube corrosion, and/or requires costly alloy. Moreover, chlorine is implicated in some of a long list of, as yet unregulated, trace toxics believed present in air emissions from coal burning (the most notorious being dioxins). The National Committee for Geochemistry of the National Research Council identified in 1980 the elements: arsenic, boron, cadmium, lead, mercury, molybdenum and selenium as "of greatest environmental concern" with respect to coal, and the elements: vanadium, chromium, nickel, copper, zinc and fluorine "of moderate concern".

The Illinois Basin is a major, well-located source of bituminous coal. While sulfur and chlorine contents vary from seam-to-seam, both tend to be relatively high. As environmental pressures have increased, the extensive mining industry in the area has suffered loss of business and jobs. A large research budget administered by the Illinois Clean Coal Institute (ICCI), formerly Center for Research on Sulfur in Coal (CRSC), has not produced an economical remedy for these impurities. My U.S. Pat. Nos. 4,714,032 and 5,050,375 specifically target the environmentally sound utilization of Illinois No. 6 coal with respect to sulfur and nitrogen oxides. The invention of this application addresses the removal of other impurities, particularly chlorine.

Conversion of MSW to energy is also impeded by impurities. Water contents are high and extremely variable. Ash contents are also high. About half of the 1000 metric tons of mercury used annually in the U.S. goes into disposable batteries, most of which wind up in MSW. Discarded batteries are also significant sources of cadmium and lead. Toxic lead, cadmium and mercury appear in the flue gas and have to be controlled by scrubbers and filters. Chlorine, originating with chlorinated plastics such as PVC (40% chlorine), averages about 0.5% but can range to as high as 1.8%. It engenders corrosive conditions in the firebox, requires alkali scrubbers and contributes to the formation of dioxins, furans and probably other dangerous air pollutants. Environmentalists are particularly sensitive to mercury vapor in flue gas; there is controvery over whether its methylated form is adequately accounted for.

In addition, bottom ash is sometimes classified as hazardous on the basis of the Environmental Protection Agency (EPA) TCLP leaching test and fly ash almost always is. Toxic metals which find their way into the ash include lead, arsenic, cadmium, selenium, chromium and mercury. Literature discloses that hazardous ash can be made to pass the TCLP test by heating it to or above its melting point, a process known as "vitrification".

Since, with coal burning, emissions of sulfur oxides are frequently a problem while MSW and fuel derived from it (RDF) are low in sulfur, there have been numerous attempts to blend the fuels so that flue gas from burning the blend (a practice known as co-firing) complies with sulfur oxide regulations. The sulfur advantage of co-firing has been overshadowed, however, by practical boiler problems, including higher requirement for excess air, poorer combustion control, increased slagging and corrosion. More recently there has been a revival of interest because of some evidence that sulfur oxides from the coal inhibits the formation of dioxins from chlorine in the RDF. However, RDF produced by conventional dry RR cannot be pulverized so as to be co-fired with pulverized coal, restricting the practice to the generally older and smaller stoker and moving grate boilers.

The world has thousands of sites at which garbage has been dumped for decades, and even centuries. Although dumping practice has improved and come to be known as "landfilling", much discarded refuse lies decaying under conditions now considered environmentally unsatisfactory. There is public pressure to remedy such old dump and landfill sites, which is bound to increase. Besides the potential hazards, much recyclable material and potential energy lies buried, awaiting economic means of recovery.

Many of the papermill sludges (besides being penalized by high water and ash contents) also contain serious amounts of chlorine and thus share the corrosion and air toxics risks hampering recovery of energy from MSW. Another potential biomass fuel high in chlorine is manure.

Although chlorine receives the lion's share of attention, MSW (as well as Industrial and Construction and Demolition Wastes) may contain lesser amounts of other halogens. In particular, fluorine from fluorinated (or chlorofluorinated) polymers may, in some cases, have toxic and/or fouling consequences. Both fluorine and bromine occur in some coals.

Environmentalists have long promoted tree farms, or other biomass crops, as renewable energy resources (which have the virtue of "recycling" carbon dioxide rather than adding to the production of greenhouse gases). The predominant impurity in renewable biomass fuels is water, which seriously detracts from, or even nullifies, their net energy value in atmospheric boilers. They generally have a low ash content which, nevertheless, can cause serious problems with low melting slags, frequently associated with sodium and/or potassium.

SUMMARY OF THE INVENTION

As already disclosed in my U.S. Pat. Nos. 4,714,032, 4,898,107, 5,000,099 and 5,050,375, the energy potential of an aqueous slurry of a carbonaceous fuel can best be realized by continuously burning or oxidizing it under pressure, as in a reactor integrated with a gas turbine, with or without the indirect transfer of reaction heat, as to boiling feedwater. The thermal efficiency of the process is a function of the energy density of the fuel, as expressed in Btu/Lb or cal/gr of slurry. Dry basis heating values vary somewhat but the main determinant of energy density is the concentration of solid fuel particles in the slurry. In other words, it is inversely proportional to water content. This concentration is limited by viscosity, which needs to be low enough that the slurry can be pumped, heated, controlled and dispersed into a reactor or combustor. Such a slurry is described herein as having a "processable viscosity".

In addition, conventional utilization is often impaired by impurities other than water, particularly sulfur, chlorine, nitrogen and slag-forming cations, such as sodium and potassium. The effects of sulfur are ameliorated by methods described in the patents cited above. This invention also decreases sulfur and nitrogen but is addressed specifically to the reduction of water, chlorine and slag-forming cations.

The viscosity restraint is tolerable with respect to high rank coals, permitting concentrations of around 50% without additives and up to about 70% with them. As rank decreases, slurry concentration or energy density, at processable viscosity, deteriorates, making such fuels increasingly unattractive for conventional use.

I have discovered that numerous solid and waste carbonaceous materials, which are unattractive fuels for conventional combustion by virtue of form, bulk, location, low heating value, moisture and poor slurryability, can be converted into useful high energy density slurry fuels. I have also discovered that, simultaneously, sodium, potassium, calcium, nitrogen, sulfur, chlorine and other difficultly soluble impurities, in amounts which would impair utilization by virtue of corrosion, slag formation and/or toxic emissions, can be significantly reduced.

These important enhancements result from providing he fuel as a slurry, which is heated under pressure, usually in the presence of an alkali, to a temperature at which a significant molecular rearrangement occurs, characterized by the splitting off of a substantial proportion of the oxygen as carbon dioxide. The temperature necessary for this rearrangement varies with the source but is usually between 500° F. and 650° F. The aggressively hydrolyzing conditions free chlorine (even from such stable polymers as PVC), sulfur and other anions to react with the alkali and to dissolve in the aqueous phase. Previously bound cations, such as sodium and potassium, are likewise made accessible to aqueous dissolution. The aqueous slurry form, as well as its heat treatment, allows the vast experience of industrial and academic chemistry to be brought to bear on undesirable impurities (including those which may not yet be identified). For example, agents specific to the extraction or neutralization of one or more impurities, including acids, peroxides and sequestering agents, may be added before, during or after heating. The carbonaceous matrix loses much of its fibrous character, and is broken up into smaller particles of char, resulting in a slurry of dramatically improved rheology, i.e., capable of a much higher concentration (or energy density) at processable viscosity.

Some biomass organics, such as sludges, may be supplied as slurries. Others, such as manure, may be semi-solid and become slurries when mixed with additional water or dilute waste. If solid, the raw fuel is shredded, chipped, ground and/or pulped to permit preparation of a processable slurry. If the slurry contains appreciable inorganic material, separable by virtue of density or other physical property, appropriate separation is performed. (In the case of MSW, the shredding, slurrying and density separation are called "wet Resource Recovery".) Because of the fine division of solids and the fluidity of the slurry, removal of toxic metals, which have a relatively high specific gravity, is essentially complete. (If justified, separated inorganics may be purified for recycling or other utilization.) When the raw fuel contains appreciable halogens, sulfur, or other acid-forming anions, alkali is added, if not already present.

This invention is particularly advantageous for co-firing a low rank coal with MSW or RDF. After carbonization and concentration, slurried blends of fossil and biomass fuels (because of bi-modality of particles) frequently exhibit higher energy density, at a specified viscosity, than slurries of either alone. The proportions of the base fuels may be adjusted to meet sulfur and nitrogen oxide emissions goals without concern for excessive slagging or corrosion. The char slurry fuel has excellent uniformity so that excess air needed for co-firing is minimized and can be controlled more precisely. Moreover, slurried fuels are fired through burners similar to those used with fuel oil and/or pulverized coal (PC), and thus are not limited to stoker or moving grate boilers.

Dense inorganics are preferably separated before blending, which may occur before carbonization or after. When carbonized in admixture, alkali naturally occurring in some low rank coals decreases the amount to be added, or makes it unnecessary. Similar synergism occurs when co-processing low rank coals with other biomass fuels in this manner.

(Conventionally, "co-firing" simply means burning a coal and a biomass fuel together. Application of the term to this invention may be misleading because the base fuels are often synergistically carbonized together before "co-firing".)

Since raw RDF contains chlorine (which can form hydrochloric acid) and most other biomass fuels contain the alkaline elements, sodium and potassium, they are a natural fit to be co-processed through slurry carbonization. Not only are both turned into uniform, high energy density liquid slurry fuels, but their chemical impurities tend to neutralize one another. (Depending on proportions, some additional alkali may be required.) It is most logical to extend the co-processing of this low sulfur fuel mixture to include otherwise non-compliant fossil fuel.

Should the char slurry resulting from the process be essentially free of harmful dissolved salts, it may be concentrated to the maximum viscosity suitable for charging to oxidation or other use. If, on the other hand, it contains appreciable dissolved salts and/or minerals which would cause operating difficulty in oxidation, or result in release of pollutants, the solid char is separated essentially completely from the aqueous phase and re-slurried, to maximum processable viscosity, in clean water. In some cases it may be desirable to wash the wet char with clean water before re-slurrying. The concentrated or re-slurried char is valuable liquid fuel, preferably converted to useful energy via pressurized oxidation.

There is a further novel and significant property of chars, produced from low ranked fuels and biomass in accordance with this invention. They are extremely reactive, even in the presence of water or steam. This reactivity makes it possible to release their chemical energy under pressure spontaneously, without the ignition and high temperature flames characteristic of conventional combustion. This controlled-temperature reaction, which I call Thermal Oxidation, minimizes the formation of sulfur and nitrogen oxides and chlororganic pollutants, the volatilization of toxic metals and the formation of adherent deposits.

In the field of conventional combustion at atmospheric pressure, it is known to introduce the combustion air in two or more stages, the principal justification being a mitigation of the formation of nitrogen oxides. In effect, the first-stage (primary) air converts the solid fuel (not necessarily completely) to a fuel gas, combustion being completed with secondary and/or tertiary air in a subsequent stage, or stages. When char slurries are prepared in accordance with this invention, they are so reactive that it is possible, particularly under pressure, to oxidize essentially all of the carbon in a first, or primary stage, with a fraction of the oxygen theoretically required for complete oxidation, and at a temperature usually in the range of 900°–1600° F., significantly lower than conventional partial or complete combustions. It is then possible to separate ash particles from the gas, before oxidation is completed with the balance of the compressed oxidant in a second-stage, which may occur in the reactor of a gas turbine. Resulting heat and pressure energy are then converted to useful mechanical and/or electrical energy.

While, with any of the embodiments described in this application, oxygen or enriched air may be used in place of air, it also may be advantageous to divert to an air separation unit, for enrichment in oxygen, only that part of the oxidant to be used in the primary stage, leaving that to be used as secondary or tertiary oxidant in its natural state.

When, however, the char slurry, as from MSW or sewage sludge, contains such quantities of toxic metals as might render its ash hazardous, primary oxidant (air and/or oxygen) to a first oxidation stage may be increased to result in an inlet zone reaction temperature above the melting point of a majority of ash constituents, resulting in ash particles being converted to molten particles (slag) which remain suspended, for a brief time, in the gaseous phase. The temperature is then reduced to a level at which the molten particles re-solidify, by means of a quench stream of secondary and/or tertiary oxidant, steam, water and/or cooled gas. Quenching occurs before separation of ash particles from the gaseous product of the oxidation.

An object of the invention is to decrease the nation's dependency on imported oil. Another object is to provide an improved means of obtaining heat and power from low grade fuels. A further object is to provide an improved means of disposing of Municipal Solid Waste and other wastes. A further object is to facilitate the remediation of existing landfills by providing a safe and economic disposition of the reclaimed, dirt-contaminated MSW. Another object is to improve the economics of utilizing fuels contaminated with moisture and chlorine. A further object is to provide a means of ameliorating the discharge of chlororganic pollutants and toxic metals into the atmosphere. A further object is to provide an efficient and continuous method of vitrifying a potentially hazardous ash. A further object is to provide an economical means of producing hot, clean, pressurized gas for driving a gas turbine. Additional objects will be apparent from a consideration of the drawings and explanations thereof.

DESCRIPTION OF PREFERRED EMBODIMENTS

Figure 1:
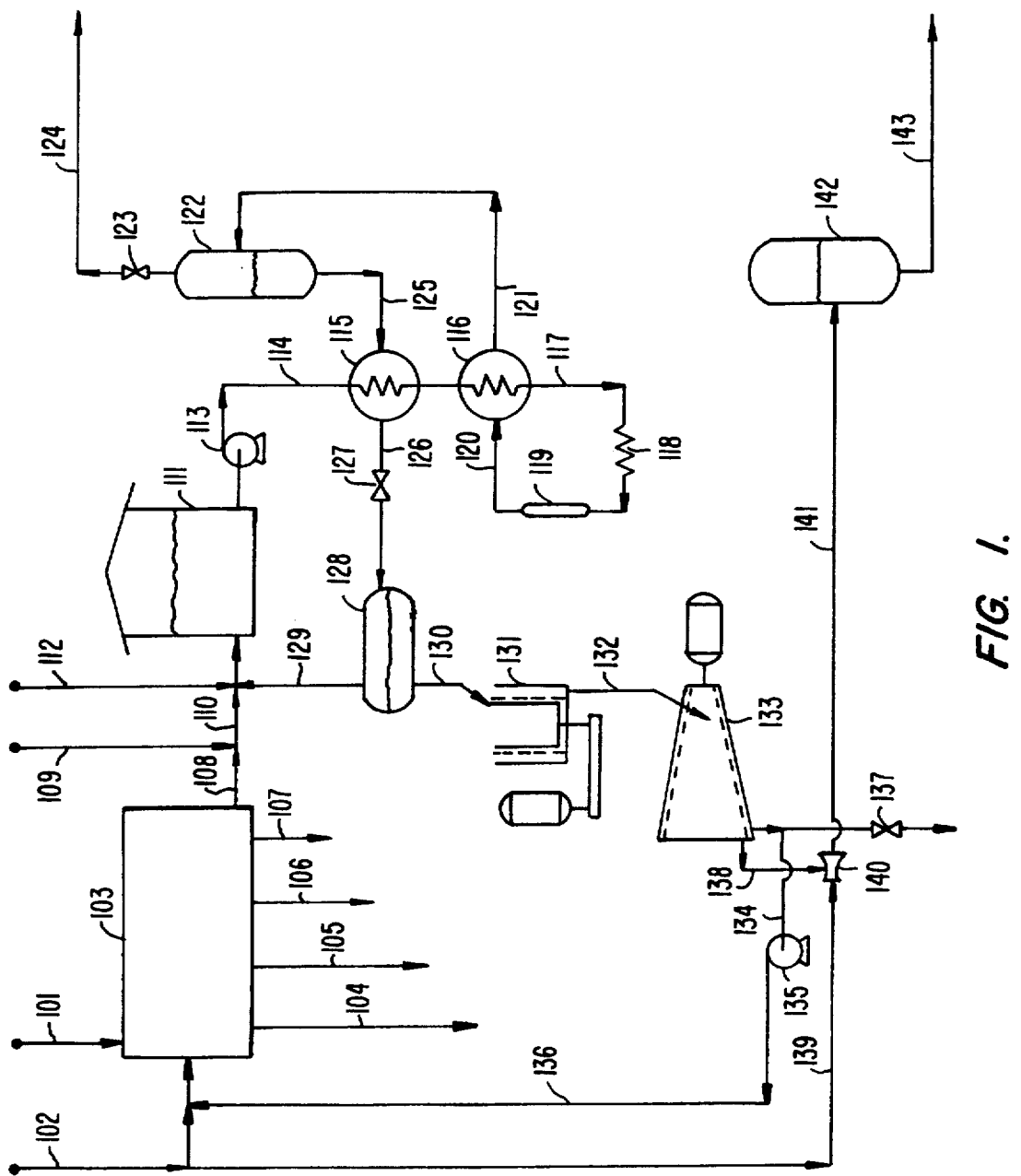
FIG. 1 is a schematic elevational diagram of an embodiment for converting a solid waste, exemplified by Municipal Solid Waste, into a high energy density, chlorine-reduced char slurry suitable for pressurized oxidation.

The embodiment of FIG. 1 is representative of the operation of the invention with respect to a solid waste containing non-combustibles heavier than water and one or more anions, such as chlorine, having corrosion and/or air pollution consequences, and/or one or more cations conducive to slagging at temperatures of oxidation or combustion. Municipal Solid Waste (MSW), which may have been reclaimed from an existing landfill or modified by curbside recycling, and/or any pre-separation deemed justified, is used for purposes of illustration.

Waste is charged to the apparatus by a conveying means 101. Make-up water is introduced through a line 102. MSW is shredded and mixed with fresh and recycled water in a wet Resource Recovery (RR) section 103, such as that licensed by Newest, Inc. In the wet RR heavy debris and dirt are settled out, being separated into discards, which exit via a conduit 104, and ferrous and non-ferrous metals, which exit via a conduit 105. The slurry from which debris and heavy metals have been settled is pulped, diluted and subjected to selective density separation in a series of density classifiers, such as hydroclones, resulting in the discharge, through a conduit 106, of wet solids rich in glass, and the discharge, through a conduit 107, of wet solids rich in aluminum. Also within the wet RR 103, the remaining slurry of essentially carbonaceous constituents undergoes preliminary concentration to about the maximum processable viscosity, water separated therefrom being recycled internally to the initial mixing operation.

The carbonaceous slurry leaves the wet RR 103 by means of a line 108, and is joined by an alkali solution or slurry, such as lime slurry, from a line 109. If not already present, alkali is added in an amount at least the chemical equivalent of the acid-forming anions in the organic slurry. Alkalis are excellent agents for assisting the release and solution of acid-forming anions. In some cases, however, removal of cations, including slag-formers and potentially toxic metals, may take precedence. In such cases, solubizing agents effective for such elements including, but not limited to, certain acids and chelating agents may supplement or substitute for the addition of alkali by means of the line 109.

Depending upon relative elevations, a transfer pump (not shown) may be required in the line 108 or a line 110 conducting the carbonaceous slurry to a storage tank 111. If perishable, the carbonaceous slurry may be sterilized, as by heating by the injection of low pressure steam into it through a line 112. Sterilization may be necessary because of the time the carbonaceous slurry may be held in the storage tank 111 to permit continuous production of char slurry product. The tank 111 may be insulated to conserve sensible heat and be provided with one or more mixers and/or a circulating pump (not shown) to aid in maintaining uniformity of slurry properties.

A charge pump 113 draws carbonaceous slurry from the tank 111 and provides sufficient pressure to move it through subsequent pressurized equipment and maintain it essentially in liquid phase. The carbonaceous slurry flows from the pump 113, through a line 114, to the cold side of a low temperature heat exchanger 115, in which it is indirectly heated by, and to an approach to the temperature of, char slurry from a line 125. From the exchanger 115 the partially heated carbonaceous slurry flows to the cold side of a high temperature heat exchanger 116, in which it is indirectly heated by, and to an approach to, the temperature of carbonized (char) slurry from a line 120, exiting therefrom via a line 117.

The difference in free energies between a prototype carbonaceous biomass molecule and the resulting char molecule plus evolved gas (mainly carbon dioxide), indicates that the process is exothermic. In theory, this heat of reaction could result in the char slurry being sufficiently hotter than the raw slurry to provide the necessary driving force to operate the exchanger 116, without the necessity for an external source of heat. In practice, considering heat losses and the variability in raw material properties, the amount and location of heat evolution, it is preferrable to assure a controlled carbonization temperature by supplying a small amount of external heat. This function is symbolized in FIG. 1 by a heater 118 in which the requisite heat is transferred indirectly, as by condensing high pressure steam, a heat transfer fluid such as Dowtherm, a fired heater, electric resistance elements, or a coil heated by hot flue gas or turbine exhaust from associated equipment, or directly by the injection of high pressure steam, hot flue gas from a pressurized burner or a small amount of air or oxygen-containing gas.

Depending upon physical arrangement, piping between the heater 118 and the hot side inlet of the heat exchanger 116 may provide sufficient time for the carbonization to be complete. If a particular carbonaceous slurry requires more time at temperature than so provided, an enlarged section, or coil, of pipe 119, may be inserted to provide a few minutes additional reaction time. Now much reduced in viscosity, the char slurry and gas evolved by carbonization reactions (or as modified by the injection of heating agent) flow through the line 120 to the hot side of the high temperature heat exchanger 116, in which they supply heat indirectly to the carbonaceous slurry which has been partially heated in the low temperature exchanger 115. They are cooled thereby to a temperature corresponding to a pressure sufficient that, after being separated in a high pressure flash drum 122, the evolved gas can flow through a control device 123 and a line 124 to a pressurized oxidation reactor.

Char slurry flows from the bottom of the drum 122 via the line 125 to the hot side of the low temperature heat exchanger 116 in which it indirectly transfers heat to incoming carbonaceous slurry, as previously described. The cooled char slurry, at a temperature near its atmospheric boiling point, flows through a line 126, under control of a flow controlling device 127, which is operated to maintain the level in the drum 122 within a desired range. Although the preponderance of gas was separated in the drum 122, a little remaining in solution in the char slurry (mainly carbon dioxide) separates out, along with an equilibrium quantity of steam, in a low pressure flash drum 128. This gas flows via a line 129 to the storage tank 111 in which it is largely absorbed in the carbonaceous slurry, or to alternative disposition.

The char slurry flows through a line 130 to a comminution device 131 which breaks up any particles large enough to cause difficulty, such as plugging, in subsequent utilization, from which it flows via a line 132 to a liquid-solids separating device 133, which may be one of several types of continuous centrifuges or filters or one or more hydroclones. The separating device is operated to essentially free the solid char particles from aqueous phase, which exits the device 133 through a line 134. Part or all of the aqueous phase is pumped by a recycle pump 135 through a line 136 as recycle water to the RR section 103. Part or all of the aqueous phase may alternatively be withdrawn from the apparatus through a flow control device 137 as a purge of salts, dissolved organic compounds and/or fine solid particles unseparated in the device 133. Such purge may go to conventional waste water treatment or have its combustible content oxidized from it by one of the processes described in my U.S. Pat. No. 4,898,107.

The separating device 133 may have provision for washing the wet char solids with clean water in order to further reduce its content of undesirable anions and/or cations. In such case washings join with the aqueous phase in being recycled and/or purged. A recycle water storage tank (not shown) may be useful or necessary for purposes of operating continuity.

Char solids discharged from the device 133 fall through a conduit 138 and are reslurried in clean water from a line 139, with the aid of a mixing device 140, to a maximum viscosity deemed suitable for subsequent processing and flow via a line 141 to a surge tank 142, in which the high energy density, chlorine-reduced char slurry is accumulated for transport through a line 143 for conversion into thermal and/or electrical energy. The tank 142 may be insulated to conserve sensible heat and be provided with one or more mixers and/or a circulating pump (not shown) to aid in maintaining uniformity of slurry properties.

Essentially the same method is utilized to recover energy from a coal whose market value is adversely affected by chlorine and/or sulfur and/or slag-forming ash ingredients. However, in place of the RR section 103, conventional coal washing and beneficiation practice may be used to minimize inorganic impurities, adjusted to deliver to the line 108, or the pump 113, a ground coal slurry of approximately maximum processable viscosity. While the response of coals to carbonization differs, it is to be expected that the majority of the chlorine and an appreciable proportion of the sulfur will be extracted into the aqueous stream separated in the device 133, and that undesirable cations will also be reduced.

In the case of forestry and agricultural byproducts, chipping, pulping and degritting, as known to the pulp and paper industry, may be employed to produce the raw carbonaceous slurry and deliver it to the line 108. Since these fuels are normally low in chlorine and sulfur, addition of alkali through the line 109 may be omitted. Nevertheless, a substantial proportion of sodium and potassium in the raw fuel will be rendered soluble in, and be separated with, the aqueous recycle and/or purge, and the char slurry will have processable viscosity at a high energy density.

In the case of a pre-existing slurry, such as a sewage or paper mill sludge, the equipment devoted to slurrying and density separation of inorganic contaminents may be omitted, i.e., those items preceding the line 110, or limited to simple degritting. Alkali, or other solubilizing agent, would be added through the line 109 only if the raw feedstock contains appreciable acid-forming anions or potentially troublesome cations, and available alkali is not already present. If no danger of bacterial decomposition exists, it is unnecessary to inject steam as through the line 112.

Similarly, should the resulting char slurry be free of large particles liable to plug downstream apparatus, the comminutor 131 may be omitted. If the raw feed does not contain appreciable amounts of extractable anions or cations, the char slurry may merely be concentrated in the device 133 to a maximum processable viscosity, rather than separated essentially completely and reslurried in clean water. In such case a single or multi-stage hydroclone (which may provide a counterflow of wash water) may economically accomplish the concentration.

The preferred disposition of the concentrated char slurry is as fuel to pressurized oxidation. Nevertheless, it can be burned in atmospheric furnaces and boilers of various kinds, without corrosion and with a positive contribution to heat release, rather than the negative thermal impact which the raw slurry would have had in similar equipment. Should the char slurry be destined for burning in an atmospheric furnace or boiler, the schematic flow arrangement, after slurrying and separation of heavy inorganics, would be simplified by combining the heat exchangers 115 and 116, eliminating the flash drum 122, separating all gas produced in the low pressure flash drum 128 and conducting it to a suitable use or incineration in the furnace or boiler.

On the other hand, for char slurry destined for pressurized oxidation or combustion, a somewhat higher overall thermal efficiency would be realized by performing the comminution (if required), and separation of char from aqueous phase and subsequent reslurrying, under essentially the same pressure as the high pressure flash in the drum 122, so that the slurry (as well as the gas) can flow without pumping to the oxidation or combustion reactor. The char slurry would then be delivered at saturation temperature, considerably hotter than its atmospheric boiling point. However, additional heat would have to be provided, as by the heater 118, to replace that formerly transferred in (now redundant) low temperature heat exchanger 116.

Figure 2:
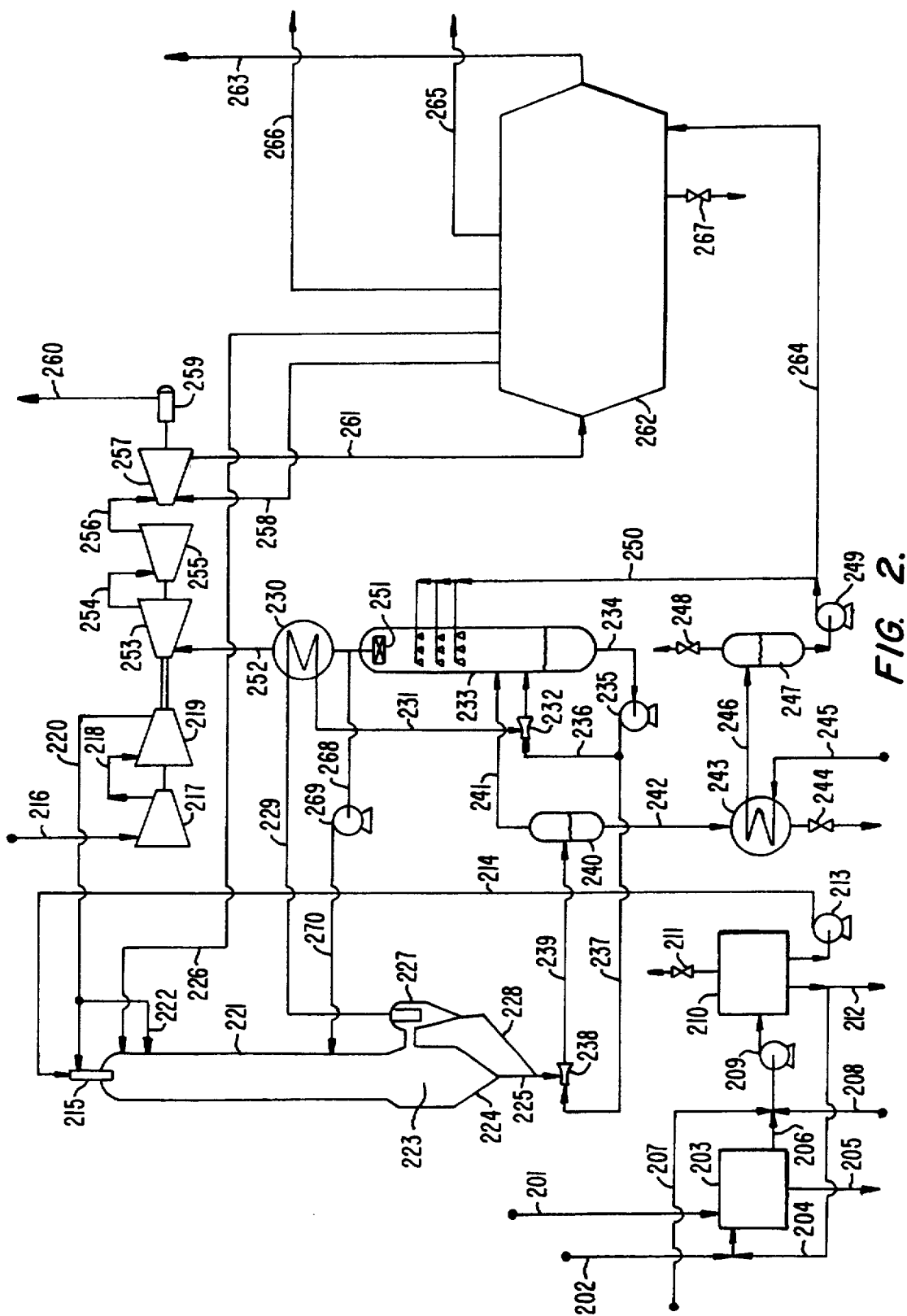
FIG. 2 is a schematic elevational diagram of an embodiment for recovering energy from a solid waste comprising slurrying and separation of dense inorganic impurities, heating under pressure in the presence of alkali, concentration of char slurry to a high energy density and recovery of electrical energy through thermal oxidation in a steam injected gas turbine with Heat Recovery Steam Generator.

The embodiment of FIG. 2 incorporates the embodiment of FIG. 1 and the conversion of the high energy density char slurry to electricity, by means of thermal oxidation in the presence of injected steam, separation of ash particles from the hot gas and conversion of its heat and pressure energy to electricity.

A solid waste, low rank or chlorine-containing fuel, or matures thereof is transported via a conveying means 201, along with make-up water from a line 202, into a grinding, mixing and slurrying facility 203, along with recycled water from a line 204. In the facility 203, which may be a wet RR (as described more fully in connection with FIG. 1) and/or washing and beneficiation apparatus, particle size is reduced and heavy inorganic impurities are separated and removed via a transport means 205. A largely carbonaceous slurry of approximately maximum processable viscosity leaves the facility 203 through a line 206 and may be alkalized by injecting a solution or slurry of alkali through a line 207. If bacterial decomposition could be a problem, the slurry may be sterilized by the injection of low pressure steam through a line 208. If operating continuity requires, a surge tank (not shown) can be inserted between the line 206 and a carbonization charge pump 209.

The pump 209 imparts to the carbonaceous slurry sufficient pressure to cause it to flow through a carbonization section 210, as more fully described in connection with FIG. 1, and maintains it essentially in liquid phase. Gas evolved during carbonization is separated within the section 210 and delivered for suitable disposal through a control device 211. Excess aqueous phase leaves the section 210 and may be recycled through the line 204 and/or purged from the apparatus through a line 212. Concentrated or reslurried char slurry is pumped from the section 210 by a reactor charge pump 213, which delivers it through a line 214 to a dispersing and mixing device 215. Should the char slurry in the line 214 be at a temperature near to its atmospheric boiling point, and it is economic to transfer to it process heat which would otherwise have been wasted, a heat exchanger (not shown) may be interposed in the line 214.

Atmospheric air is drawn through a conduit 216, in which may be located a conventional dust filter (not shown), to the suction of a first stage air compressor 217, which delivers it at an elevated pressure through a connection 218 to a second stage air compressor 219, which delivers it hot and at a further increased pressure to a line 220. (Two-stage gas turbine compressors of some manufacturers may have an intercooler, and a drum in which to disengage condensate, interposed between first and second stages.)

Char slurry from the line 214 and air (oxidant) from the line 220 are intimately mixed in, or immediately following, the mixing device 215. The air may be divided among primary and secondary passages and the device 215 may contain swirl baffles and/or other dispersing and mixing means known to the arts of mixer, burner and/or spray drier design, including air and/or steam atomization. The air-slurry mixture discharges into the inlet zone of an elongated oxidation reactor 221, which may have internals (not shown) as described for FIG. 1 of U.S. Pat. No. 5,050,375, to induce recirculation of hot oxidation products to the inlet zone, for the purpose of quickly heating the fuel-air mixture to a temperature at which the reaction proceeds rapidly. Secondary or tertiary air may be added to the internal recycle as through the connection 222.

Part or all of the air in the line 220 may be diverted to an air separation unit to be enriched in oxygen. In particular, that part to be mixed with the char slurry as primary oxidant may be so enriched.

Gas evolved in the carbonization section 210 and shown to be exiting via the control device 211 may also be introduced to the mixer 215 or the inlet zone of the reactor 221 (by means of connections not shown).

The internal diameter of the reactor 221 is chosen to provide a relatively high velocity reaction zone such that solid particles remain entrained in and flow with the gaseous phase. Fuel particles react with oxygen to form carbon dioxide and water vapor, releasing the corresponding heat of reaction and causing the temperature of the mixture to rise. The maximum temperature is limited, however, by adjustment of the oxidant:slurry ratio.

Upon being discharged into an expanded diameter disengaging zone 223, kinetic energy of solid particles, together with the force of gravity, causes most of them to disengage from gaseous products and fall to a conical bottom section 224, from which they are withdrawn through a main standpipe 225. The conical bottom of the section 224 may contain aeration connections (not shown) through which air and/or steam is injected to maintain the solid particles in free-flowing condition.

While the principal control of oxidation temperature is by fuel slurry:oxidant ratio, this temperature is moderated by the injection of high pressure steam as through one or a plurality of connections symbolized by a line 226.

Figure 3:
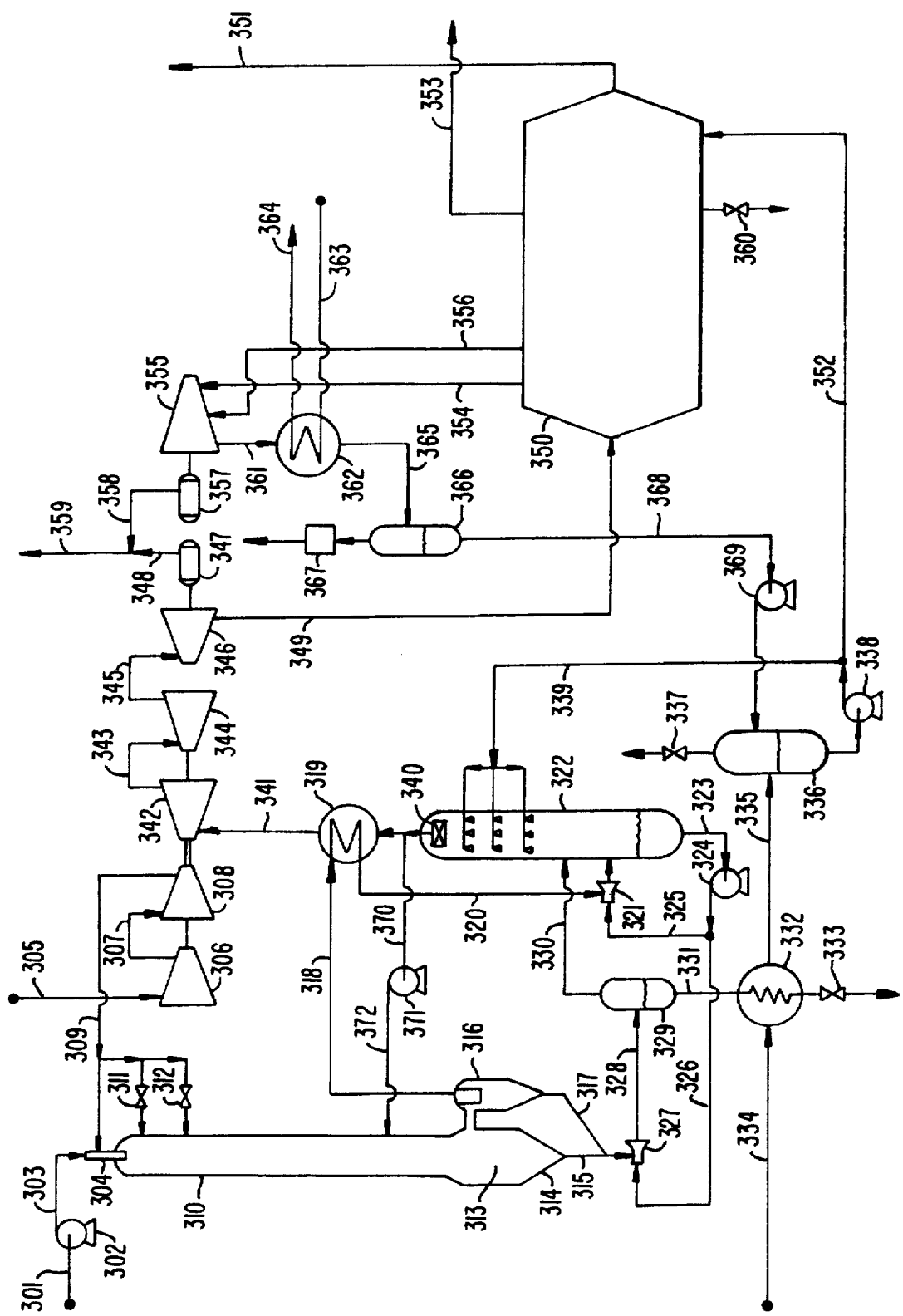
FIG. 3 is a schematic elevational diagram of a combined cycle energy conversion embodiment comprising a gas turbine, Heat Recovery Steam Generator and condensing steam turbine generator.
Figure 5:
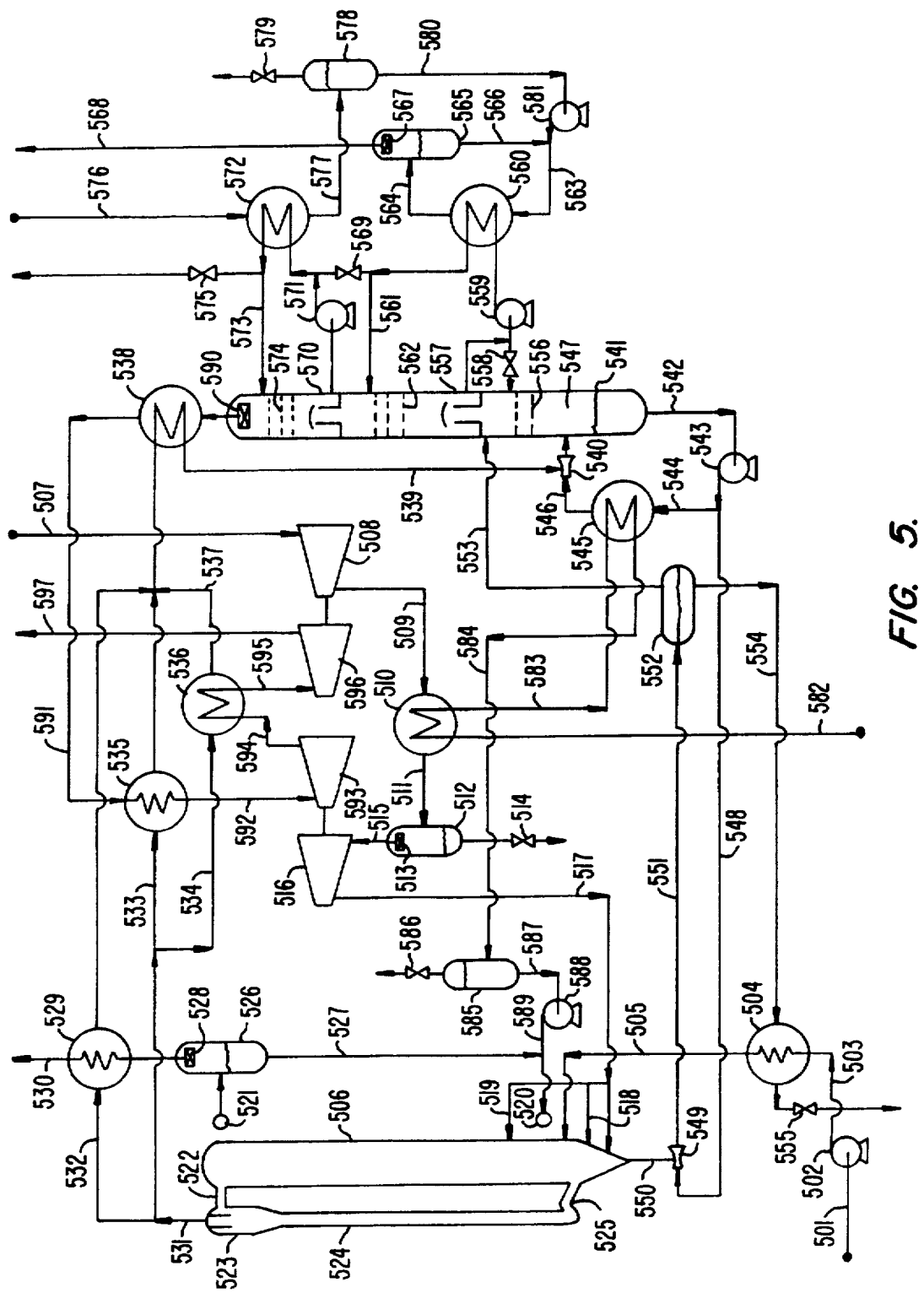
FIG. 5 is a schematic elevational diagram of an alternative energy conversion embodiment comprising a pressurized circulating fluidized bed boiler and condensing steam turbine generator.

Although the flow direction of the reactor 221 illustrated in FIG. 2 is downward, entrained flow reactors for my invention may also be upflow or horizontal and the products recycle passage may be external, rather than internal. FIG. 3 of U.S. Pat. No. 5,050,375 illustrates a U-shaped reactor, permitting a relatively short external recycle passage. Reactors for the embodiment of FIG. 2 are not necessarily of entrained flow type but may be configured as circulating fluidized bed reactors, as illustrated in FIG. 5, including those which operate in "transport" phase.

Product gas, carrying some fine ash particles, discharges from the disengaging zone 223 to a cyclone separator 227. Utilizing centrifugal force, the separator 227 performs a further separation between the gas and entrained particles, which fall by gravity into a standpipe 228 which joins the main standpipe 225. Other cyclone configuration, including multi-stage, or other known gas-solids separation devices, may be substituted for the cyclone 227.

Product gas, still carrying fine dust particles unseparated in the cyclone 227, flow through a line 229 to the hot side of a reheat exchanger 230 in which they are cooled to a temperature approaching their dew point by indirect exchange with clean (scrubbed) gas. Cooled product gas then flow via a line 231 to a gas-liquid contactor 232 in which they are further cooled to their dew point and have entrained dust particles wetted by contact with fines slurry recirculated from the base of a scrubber vessel 233, by means of a suction line 234, a fines slurry pump 235 and a recirculation line 236.

The pump 235 also supplies the net production of fines slurry through a line 237 to an eductor 238, which receives the ash particles separated in the disengaging zone 223 and the cyclone 227 via the standpipes 225 and 228. In the eductor 238 the ash particles, accompanied by some gas, are cooled, wetted, slurried and discharged through a line 239 to a fluidizing gas separator 240. In the separator 240 fluidizing gas is disengaged from the ash slurry and separated for venting, along with an equilibrium amount of steam, via a line 241, into the scrubber 233. (The latent heat of steam accompanying the gas in the line 241 represents heat recovered from hot ash.) Ash slurry is withdrawn via a bottom connection into a line 242 from which it flows to the hot side of a ash slurry-feedwater heat exchanger 243 in which it is cooled to a temperature suitable for discharge, through a pressure control device 244, to conventional ash slurry disposal. In some cases the heat in ash slurry in the line 242 may be used to heat incoming char slurry instead of feedwater.

Treated boiler feedwater enters the apparatus, under pressure from an offsite pump, via a line 245, and is preheated by indirect heat exchange with ash slurry in the exchanger 243. From the exchanger 243 it flows via a line 246 to a boiler feedwater accumulator 247 (which may be a "deaerator" of proprietary design). Gases liberated by the heating in the exchanger 243 are vented to the atmosphere from the top of the accumulator 247 through a pressure control device 248. A boiler feedwater pump 249 takes suction from the accumulator 247 and discharges feedwater through a line 250 to a series of spray nozzles arrayed across the upper cross-section of the scrubber 233. Spray nozzles may be disposed on a plurality of levels. The purpose of the feedwater sprayed into the gas stream rising through the scrubber 233 is to cool it slightly below its dew point, condensing from it a small part of the steam it contains. Condensation of water on and around dust particles effectively wets them and removes them from the gaseous phase. In order to increase the liquid/gas ratio of the spray contact, spray water may be recirculated by means of an internal sump and circulation pump (not shown). Water from another suitable source may be substituted for boiler feedwater.

Clean product gas (containing a substantial content of steam) leaves the scrubber 233 through a mist extractor 251 and flows to the cold side of the reheat exchanger 230, in which it is heated by hot product gas to an approach to its temperature. The reheated clean product gas returns to the turbo-machinery via a line 252.

As an alternative to the scrubbing system comprising the reheat exchanger 230, the scrubber 233, the contactor 232, the mist extractor 251 and associated piping connections, another method of separating fine dust from hot gas-steam, such as a plurality of porous ceramic filter thimbles, may be employed.

The hot clean gas is partially expanded through a first-stage turbine 253, which delivers mechanical energy, in the form of shaft horsepower, to the second-stage air compressor 219. In order to maintain critical components of the turbine 253 within safe operating temperatures, high pressure steam, and/or air from the line 220, may be supplied to internal cooling passages (through connections not shown).

Having been cooled by giving up energy in the turbine 253, the partially expanded gas flows via a crossover 254 to be expanded further in a second-stage turbine 255, which delivers mechanical energy, in the form of shaft horsepower, to the first-stage air compressor 217. Having been further cooled by giving up energy in the turbine 255, the further expanded gas flows via a crossover 256 to be expanded again in a third-stage turbine 257. Supplementing the discharge of the turbine 255 in driving the turbine 257 is superheated intermediate pressure steam joining it by means of a line 258. The turbine 257 delivers mechanical energy, in the form of shaft horsepower, to a generator (or alternator) 259 which converts it into electricity. After diversion of a small amount to power internal services, such as lubricating oil pumps (through a conduit not shown), the net production of electricity is delivered from the apparatus through a conduit 260.

The injection of steam into the reactor via the line 226 and into the turbine 257 through the line 258 categorizes the gas turbine set as a "steam injected gas turbine" or "STIG".

The embodiment of FIG. 2 is structured to take advantage of gas turbines which are, or are expected to become, commercially available. The pressure of the reactor 221 is determined by the discharge pressure of the compressor 219. The discharge pressure of the turbine 253 is adjusted so that it produces only as much power as consumed by the compressor 219. Similarly, the discharge pressure of the turbine 255 is adjusted so that it produces only as much power as consumed by the compressor 217, excess potential energy in the gas being transferred to the turbine 257 in the form of pressurized exhaust.

Although illustrated by means of turbo-machinery supplied by a particular manufacturer, the embodiment of FIG. 2 can readily be adapted to turbo-machinery from other manufacturers having a different air discharge pressure and/or variations in the numbers of individual machines and their inter-relationships.

The turbine 257 discharges into an exhaust manifold 261 which conducts the fully expanded gas to a Heat Recovery Steam Generator (HRSG) 262. The HRSG 262 is a more-or-less standardized assembly of economizers, boilers and superheaters, designed for heat recovery from turbine exhaust and available from several manufacturers. As configured for this embodiment it comprises an economizer, low, intermediate and high pressure boilers and a superheater for intermediate pressure steam. A number of other configurations are feasible alternatives, particularly as regards steam pressures and disposition of economizer(s) and superheater(s).

Exhaust, from which economically useful heat has been recovered, is discharged to the atmosphere through a vent 263. Boiler feedwater is supplied to the HRSG 262 by the pump 249 by way of a line 264. Low pressure steam is delivered through a line 265 to offsite use, such as for sterilization of raw slurry (if needed), by means of the line 208, and for building heating during cold weather. Intermediate pressure steam is superheated and delivered through the line 258 to the inlet of the turbine 257. High pressure steam is delivered through the line 226 to the air-slurry mixer 215 and/or the reactor 221. Some of the intermediate pressure steam may be diverted to offsite use through a line 266. Although high pressure steam is nominally unsuperheated, in practice it is preferrable to impart to it a minor degree of superheat to minimize troublesome condensation in its piping. Blowdown is cascaded from high pressure boiler to intermediate to low pressure boiler and withdrawn from the HRSG 262 through a control device 267. Since the offsite demand for low pressure steam is expected to be intermittent, the HRSH 262 is equipped with feedwater piping connections and valving which permit heat transfer surface to be shifted from the low pressure boiler to the economizer coil and the intermediate pressure boiler.

The HRSG 262 may be equipped for firing with supplemental fuel (i.e., employ "duct burners") and can incorporate a coil in which to finish the heating of carbonaceous slurry to carbonization temperature.

If, in spite of the density separations performed in the unit 203 and the extractions performed in the unit 210, the char slurry being charged to the reactor 221 contains toxic metals such that its ash might be rated as hazardous, the amount of primary oxidant mixed with the slurry in the mixer 215, and/or its oxygen concentration, may be increased so that the temperature reached in the upper part of the reactor 221 exceeds the fusion point of a majority of ash ingredients. Suspended ash particles then become small globules of molten slag. The subsequent admission of steam through the line 226 and/or secondary or tertiary oxidant through the line 222 (besides completing the oxidation) quenches the mix temperature to a level below the ash fusion point so that the ash separated from product gas in the disengaging zone 223 and the cyclone 227 is in the form of roughly spherical, non-adherent particles.

It is also possible to perform part or all of the quenching of the hot gas-slag globules mixture with cooled clean product gas recycled from the top of the scrubber 233 by means of a line 268, a gas circulator 269 and a quench line 270. Alternatively, part or all of the quenching may be accomplished with water injected above the disengaging zone 223 (by means of a line not shown). Quenching by either, or a combination, of these other means decreases the amount of excess air needed to regulate the temperature of product gas in the zone 223, thereby making more available for oxidizing additional char slurry.

Quenching with recycled cleaned product gas may entail a substantial recycle through the disengaging zone 223, the cyclone 227, the hot side of the exchanger 230 and the scrubber 233. The thermal capacity of the net cleaned product gas on the cold side of the exchanger 230 may be inadequate for this duty. Up to a point additional cooling duty can be shifted to an exchanger (not shown but similar to the exchanger 545 of FIG. 5), preheating char slurry or boiler feedwater, interposed in the line 236. But, it may also be necessary to supplement such hot product gas cooling duty by means of an exchanger or waste heat boiler (not shown) in parallel or series with the exchanger 230, transferring part of it to, for example, boiler feedwater.

Although each are diagrammed as a single connection, steam, air, cooled gas and/or water may actually be injected into the reactor 221 through a plurality of connections around its circumference and located in more than one horizontal plane.

Not shown in FIG. 2 are auxiliary systems and equipment, such as those needed to bring the apparatus on stream from a cold start, back-up fuel and power, blowdown and pressure relief systems.

The embodiment of FIG. 3 incorporates the embodiment of FIG. 1 and the conversion of the high energy density char slurry to electricity, by means of thermal oxidation, separation of ash particles from the hot gas and conversion, by means of a gas turbine generator, of its heat and pressure energy to electricity. Heat remaining in turbine exhaust is converted to steam which, expanded through a condensing steam turbine generator, produces additional electricity.

The concentrated or re-slurried char slurry enters the apparatus, preferably at the temperature at which it was produced, through a line 301 and is pressurized by a reactor charge pump 302, which delivers it through a line 303 to a dispersing and mixing device 304. Should the char slurry in the line 303 be at a temperature near to its atmospheric boiling point, and it is economic to transfer to it process heat which would otherwise have been wasted, a heat exchanger (not shown) may be interposed in the line 303.

Atmospheric air is drawn through a conduit 305, in which may be located a conventional dust filter (not shown), to the suction of a first stage air compressor 306, which delivers it at an elevated pressure through a connection 307 to a second stage air compressor 308, which delivers it hot and at a further increased pressure to a line 309. (Two-stage gas turbine compressors of some manufacturers may have an intercooler, and a drum in which to disengage condensate, interposed between first and second stages.)

Char slurry from the line 303 and air from the line 309 are intimately mixed in, or immediately following, the mixing device 304. The air may be divided among primary and secondary passages and the device 304 may contain swirl baffles and/or other dispersing and mixing means known to the arts of mixer, burner and/or spray drier design, including air and/or steam atomization. The air-slurry mixture discharges into the inlet zone of an elongated oxidation reactor 310, which may have internals (not shown) as described for FIG. 1 of U.S. Pat. No. 5,050,375, to induce recirculation of hot oxidation products to the inlet zone, for the purpose of quickly heating the fuel-air mixture to a temperature at which the reaction proceeds rapidly. The air in the line 309 may be partially diverted as secondary or tertiary air to the reacting mixture downstream of the mixing device 304, as through connections 311 and 312.

Gas evolved in a carbonization section, such as that illustrated in FIG. 1, and shown to be exiting via the line 124, may also be introduced to the mixer 304 or the inlet zone of the reactor 310 (by means of connections not shown).

The internal diameter of the reactor 310 is chosen to provide a relatively high velocity reaction zone such that solid particles remain entrained in and flow with the gaseous phase. Char particles react with oxygen to form carbon dioxide and water vapor, releasing the corresponding heat of reaction and causing the temperature of the mixture to rise. The maximum temperature is limited, however, by adjustment of the air:slurry ratio.

Upon being discharged into an expanded diameter disengaging zone 313, kinetic energy of solid particles, together with the force of gravity, causes most of them to disengage from gaseous products and to fall to a conical bottom section 314, from which they are withdrawn through a main standpipe 315. The section 314 may contain aeration connections (not shown) through which air and/or steam is injected to maintain the solid particles in free-flowing condition.

Although the flow direction in the reactor 310 illustrated in FIG. 3 is downward, entrained flow reactors for my invention may also be upflow or horizontal and the products recycle passage may be external, rather than internal and axial. FIG. 3 of U.S. Pat. No. 5,050,375 illustrates a U-shaped reactor, permitting a relatively short external recycle passage. Reactors for the embodiment of FIG. 3 are not necessarily of entrained flow type but may be configured as circulating fluidized bed reactors, as illustrated in FIG. 5, including those which operate in "transport" phase.

Product gas, carrying some fine ash particles, discharges from the disengaging zone 313 to a cyclone separator 316. Utilizing centrifugal force, the separator 316 performs a further separation between gas and entrained particles, which fall by gravity into a standpipe 317 which joins the main standpipe 315. Other cyclone configurations, including multi-stage, or other known gas-solids separation devices, may be substituted for the cyclone 316.

Product gases, still carrying fine dust particles unseparated in the cyclone 316, flow through a line 318 to the hot side of a reheat exchanger 319, in which they are cooled to a temperature slightly above their dew point by indirect exchange with clean (scrubbed) product gas. Cooled product gas then flows via a line 320 to a contacting device 321 in which they are cooled to their dew point and have entrained dust particles wetted by contact with fines slurry recirculated from the base of a scrubber vessel 322, by means of a suction line 323, a fines slurry pump 324 and a recirculation line 325.

The pump 324 also supplies the net production of fines slurry through a line 326 to an eductor 327, which receives the ash particles separated in the disengaging zone 313 and the cyclone 316 via the standpipes 315 and 317. In the eductor 327 the ash particles, accompanied by some gas, are cooled, wetted, slurried and discharged through a line 328 to a fluidizing gas separator 329. In the separator 329 fluidizing gas is disengaged from the ash slurry and separated for venting, along with an equilibrium amount of steam, via a line 330, into the scrubber 322. (The latent heat of steam accompanying the gas in the line 330 represents heat recovered from hot ash.) The ash slurry is withdrawn via a bottom connection into a line 331 from which it flows to the hot side of an ash slurry-feedwater heat exchanger 332 in which it is cooled to a temperature suitable for discharge, through a pressure control device 333, to conventional ash slurry disposal. In some cases the heat in ash slurry from the separator 329 may be used to heat incoming char slurry instead of feedwater.

Treated boiler feedwater enters the apparatus, under pressure from an offsite pump, via a line 334, and is preheated by indirect heat exchange with ash slurry in the exchanger 332. From the exchanger 332 it flows via a line 335 to a boiler feedwater accumulator 336 (which may be a "deaerator" of proprietary design). Gases liberated by the heating in the exchanger 332 are vented to the atmosphere from the top of the accumulator 336 through a pressure control device 337. A boiler feedwater pump 338 takes suction from the accumulator 336 and discharges feedwater through a line 339 to a plurality of spray nozzles arrayed across the upper cross-section of the scrubber 322. Spray nozzles may be disposed on more than one level. The purpose of the feedwater sprayed into the gas stream rising through the scrubber 322 is to cool it slightly below its dew point, condensing from it a small part of the steam it contains. Condensation of water on and around dust particles effectively wets them and removes them from the gaseous phase. In order to increase the liquid/gas ratio of the spray contact, spray water may be recirculated by means of an internal sump and circulation pump (not shown). Water from another suitable source may be substituted for boiler feedwater.

Clean product gas leaves the scrubber 322 through a mist extractor 340 and flows to the cold side of the reheat exchanger 319, in which it is indirectly heated by hot product gas to an approach to its temperature. The reheated gas returns to the turbo-machinery via a line 341.

As an alternative to the scrubbing system comprising the reheat exchanger 319, the scrubber 322, the contactor 321, the mist extractor 340 and associated piping connections, another method of separating fine dust from hot gas-steam, such as a plurality of porous ceramic filter thimbles, may be employed.

The hot clean gas is partially expanded through a first-stage turbine 342, which delivers mechanical energy, in the form of shaft horsepower, to the second-stage air compressor 308. In order to maintain critical components of the turbine 342 within safe operating temperatures, high pressure steam, and/or air from the discharge of the compressor 308, may be supplied to internal cooling passages (through connections not shown).

Having been cooled by giving up energy in the turbine 342, the partially expanded gas flows via a crossover 343 to be expanded further in a second-stage turbine 344, which delivers mechanical energy, in the form of shaft horsepower, to the first-stage air compressor 306. Having been further cooled by giving up energy in the turbine 344, the further expanded gas flows via a crossover 345 to be expanded again in a third-stage turbine 346, which delivers mechanical energy, in the form of shaft horsepower, to a generator (or alternator) 347 which converts it into electricity and discharges it through a conduit 348.

The pressure of the reactor 310 is determined by the discharge pressure capability of the compressor 308. The discharge pressure of the turbine 342 is adjusted so that it produces only as much power as consumed by the compressor 308. Similarly, the discharge pressure of the turbine 344 is adjusted so that it produces only as much power as consumed by the compressor 306, excess potential energy in the gas-steam being transferred to the turbine 346 in the form of pressurized exhaust.

While FIG. 3 is illustrated by means of turbo-machinery supplied by a particular manufacturer, it can readily be adapted to turbo-machinery from other manufacturers having a different air discharge pressure and/or variations in the numbers of individual machines and their interrelationships.

The turbine 346 discharges into an exhaust manifold 349 which conducts the fully expanded product gas to a Heat Recovery Steam Generator (HRSG) 350. The HRSG 350 is a more-or-less standardized assembly of economizers, boilers and superheaters, designed for heat recovery from turbine exhaust and available from several manufacturers. As configured for this embodiment the HRSG 350 comprises economizer, low, intermediate and high pressure boilers and superheaters for high and intermediate pressure steam. A number of other configurations are feasible alternatives, particularly as regards steam pressures, reheat coils and arrangement of economizer(s) and superheater(s).

Exhaust, from which economically useful heat has been recovered, is discharged to the atmosphere through a vent 351. Boiler feedwater is supplied to the HRSG 350 by the pump 338 by way of a line 352. A high pressure feedwater booster pump (not shown) may be necessary to charge the high pressure boiler. Low pressure steam is delivered through a line 353 to offsite use, mainly for sterilization of raw slurry (if needed), and for building heating during cold weather. Superheated high pressure steam flows via a line 354 to the inlet of a condensing steam turbine 355. Superheated intermediate steam flows via a line 356 to an interstage of the turbine 355 appropriate for its pressure. The energy produced by the expansion of the high and intermediate pressure steam in the turbine 355 is transmitted, as shaft horsepower, to a generator (or alternator) 357 which converts it to electricity, which flows via a conduit 358 to join with that in the conduit 348. After diversion of a small amount to power internal services, such as lubricating oil pumps (through a conduit not shown), the net production of electricity is delivered from the apparatus through the conduit 359. If other installations at site have a need for saturated and/or superheated intermediate pressure steam a quantity may be diverted from the turbine 355 by means of a line or lines (not shown). Since the demand for low pressure steam is liable to be intermittent, a connection (not shown) may also be provided to convey excess low pressure steam to an appropriate stage of the turbine 355. Blowdown is cascaded from high pressure boiler to intermediate to low pressure boiler and withdrawn from the HRSG 350 through a control device 357. The HRSG 350 may be equipped for firing with supplemental fuel (i.e., employ "duct burners") and can incorporate a coil in which to finish the heating of carbonaceous slurry to carbonization temperature.

Fully expanded steam leaves the turbine 355 through a vacuum line 361 which conducts it to the hot side of a vacuum surface condenser 362. As shown, the heat necessary to condense the steam and create a vacuum is indirectly transferred to cooling water, supplied to the cold side of the condenser 362 by means of a line 363 and returned to an offsite cooling tower through a line 364. Alternatively, an air-cooled condenser could have been used in place of the water-cooled condenser 362. Steam condensate collects in the bottom of the condenser 362 from which it drains by gravity through a line 365 to a condensate receiver 366. An evacuation device 367, which may be a vacuum pump or steam jet ejector, is connected to the top of the receiver 366 in order to dispose to the atmosphere of any non-condensible gas entering the condenser 362, as with the steam exhausted from the turbine 355. From the receiver 366 steam condensate flows via a line 368 to a condensate pump 369, which gives it sufficient pressure to discharge into the accumulator 336.

If, in spite of the density separations and extractions performed during its preparation, the char slurry being charged to the reactor 310 contains toxic metals such that its ash might be rated as hazardous, the amount of primary oxidant mixed with the slurry in the mixer 304, and/or its oxygen concentration, may be increased so that the temperature reached in the upper part of the reactor 310 exceeds the fusion point of a majority of ash ingredients. Suspended ash particles then become small globules of molten slag. The subsequent admission of secondary or tertiary oxidant through the lines 311 and 312 (besides completing the oxidation) quenches the mix temperature to a level below the ash fusion point so that the ash separated from product gas in the disengaging zone 313 and the cyclone 316 is in the form of roughly spherical, non-adherent particles.

It is also possible to perform part or all of the quenching of the hot gas-slag globules mixture with cooled clean product gas recycled from the top of the scrubber 322 by means of a line 370, a gas circulator 371 and a quench line 372. Alternatively, the quenching may be accomplished with water injected above the disengaging zone 313 (by means of a line not shown). Quenching by either, or a combination, of these other means decreases the amount of excess air needed to regulate the temperature of product gas in the line 318, thereby making more available for oxidizing additional char slurry.

Quenching with recycled cleaned product gas may entail a substantial recycle through the disengaging zone 313, the cyclone 316, the hot side of the exchanger 319 and the scrubber 322. The thermal capacity of the net clean product gas on the cold side of the exchanger 319 may be inadequate for this duty. Up to a point additional cooling duty can be shifted to an exchanger (not shown but similar to the exchanger 545 of FIG. 5), preheating char slurry or boiler feedwater, interposed in the line 325. But, it may also be necessary to supplement such hot product gas cooling duty by means of an exchanger or waste heat boiler (not shown) in parallel or series with the exchanger 319, transferring part of it to, for example, boiler feedwater.

Although each are diagrammed as a single connection, air, cooled gas or water may actually be injected into the reactor 310 through a plurality of connections around its circumference and located in more than one horizontal plane.

Not shown in FIG. 3 are auxiliary systems and equipment, such as those needed to bring the apparatus on stream from a cold start, back-up fuel and power, blowdown and pressure relief systems.

Figure 4:
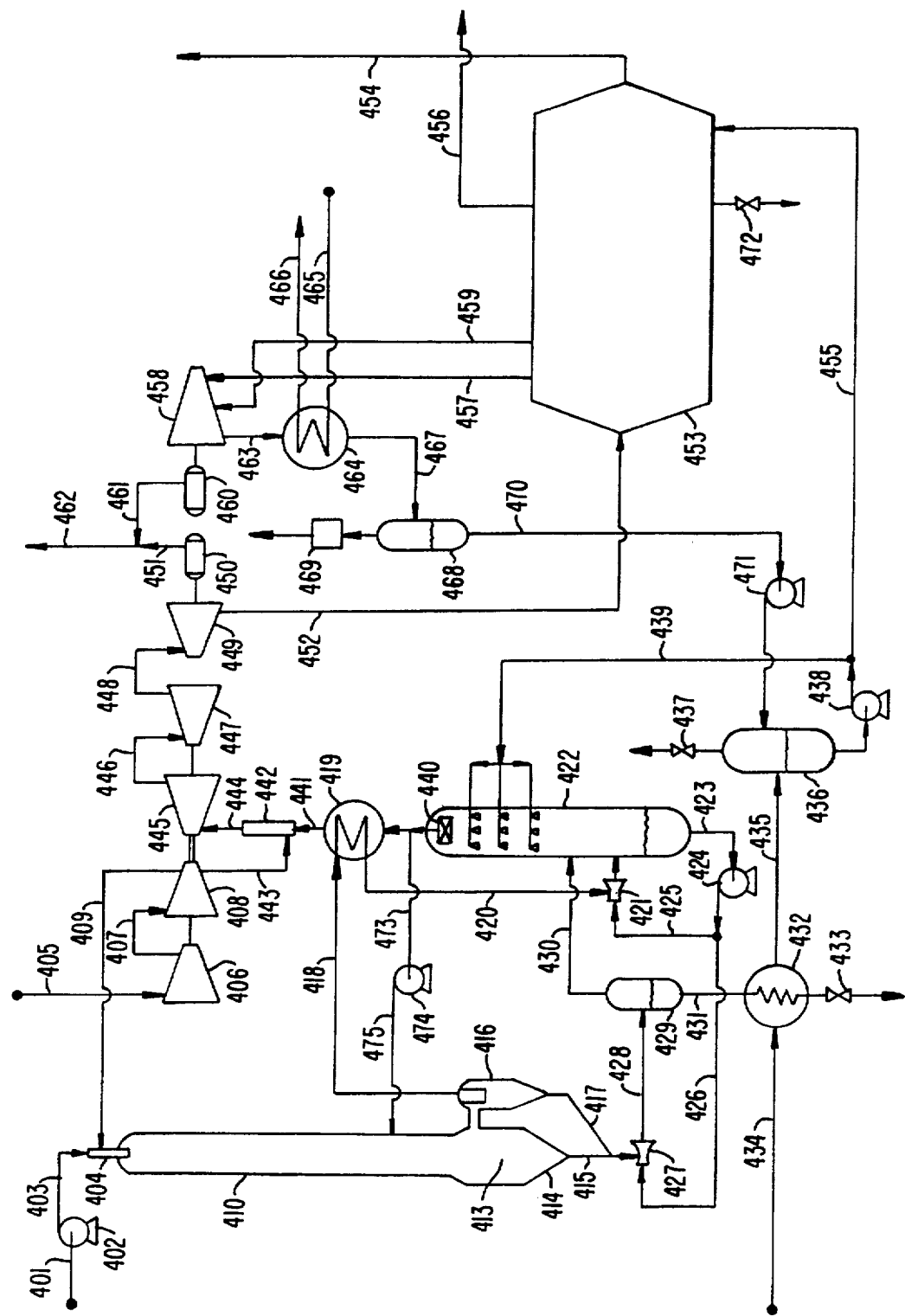
FIG. 4 is a schematic elevational diagram of a combined cycle energy conversion embodiment in which thermal oxidation of char slurry is conducted in two stages, with particulate removal between stages.

The embodiment of FIG. 4 incorporates the embodiment of FIG. 1 and the conversion of the high energy density char slurry to electricity, by means of two-stage thermal oxidation, separation of ash particles from the first-stage gas and conversion, by means of a gas turbine generator, of its chemical, thermal and pressure energy to electricity. Heat remaining in turbine exhaust is converted to steam which, expanded through a condensing steam turbine generator, produces additional electricity.

The concentrated or re-slurried char slurry enters the apparatus, preferably at the temperature at which it was produced, through a line 401 and is pressurized by a reactor charge pump 402, which delivers it through a line 403 to a dispersing and mixing device 404. Should the char slurry in the line 403 be at a temperature near to its atmospheric boiling point, and it is economic to transfer to it process heat which would otherwise have been wasted, a heat exchanger (not shown) may be interposed in the line 403.

Atmospheric air is drawn through a conduit 405, in which may be located a conventional dust filter (not shown), to the suction of a first stage air compressor 406, which delivers it at an elevated pressure through a connection 407 to a second stage air compressor 408, which delivers a portion of the compressed air hot and at a further increased pressure to a line 409. (Two-stage gas turbine compressors of some manufacturers may have an intercooler, and a drum in which to disengage condensate, interposed between first and second stages.)

Part or all of the air in the line 409 may be diverted to an air separation unit (not shown) so that the oxidant going to the mixer 404 may have an oxygen concentration greater than that of normal air.

Char slurry from the line 403 and compressed oxidant from the line 409 are intimately mixed in, or immediately following, the mixing device 404. The oxidant may be divided among primary and secondary passages and the device 404 may contain swirl baffles and/or other dispersing and mixing means known to the arts of mixer, burner and/or spray drier design, including air and/or steam atomization. The oxidant-slurry mixture discharges into the inlet zone of an elongated oxidation reactor 410, which may have internals (not shown) as described for FIG. 1 of U.S. Pat. No. 5,050,375, to induce recirculation of hot oxidation products to the inlet zone, for the purpose of quickly heating the slurry-oxidant mixture to a temperature at which the reaction proceeds rapidly.

Gas evolved in a carbonization section, such as that illustrated in FIG. 1, and shown to be exiting via the line 124, may also be introduced to the mixer 404 or the inlet zone of the reactor 410 (by means of connections not shown).

The internal diameter of the reactor 410 is chosen to provide a relatively high velocity reaction zone such that solid particles remain entrained in and flow with the gaseous phase. Char particles react with oxygen to form carbon monoxide and dioxide and hydrogen, releasing the corresponding heat of reaction and causing the temperature of the mixture to rise, resulting in some light hydrocarbon gases as well being evolved from the char particles, and forming a fuel gas. The maximum temperature is, however, limited, by adjustment of the oxidant:slurry ratio.

Upon being discharged into an expanded diameter disengaging zone 413, kinetic energy of solid particles, together with the force of gravity, causes most of them to disengage from the fuel gas and to fall to a conical bottom section 414, from which they are withdrawn through a main standpipe 415. The section 414 may contain aeration connections (not shown) through which steam and/or cooled gas is injected to maintain the solid particles in free-flowing condition.

Although the flow direction in the reactor 410 illustrated in FIG. 4 is downward, entrained flow reactors for my invention may also be upflow or horizontal and the products recycle passage may be external, rather than internal and axial. FIG. 3 of U.S. Pat. No. 5,050,375 illustrates a U-shaped reactor, permitting a relatively short external recycle passage. Reactors for the embodiment of FIG. 4 are not necessarily of entrained flow type but may be configured as circulating fluidized bed reactors, such as illustrated in FIG. 5, including those which operate in "transport" phase, and which have provision for introducing the char slurry above the oxidant inlet, at a point that oxygen has been depleted.

Hot fuel gas, carrying some fine ash particles, discharges from the disengaging zone 413 to a cyclone separator 416. Utilizing centrifugal force, the separator 416 performs a further separation between gas and entrained particles, which fall by gravity into a standpipe 417 which joins the main standpipe 415. Other cyclone configurations, including multi-stage, or other known gas-solids separation devices, may be substituted for the separator 416.

Hot fuel gases, still carrying fine dust particles unseparated in the cyclone 416, flow through a line 418 to the hot side of a reheat exchanger 419 in which they are cooled to a temperature approaching their dew point by indirect exchange with scrubbed gas. Cooled fuel gases then flow via a line 420 to a contacting device 421 in which they are further cooled to their dew point and have entrained dust particles wetted by contact with fines slurry recirculated from the base of a scrubber vessel 422, by means of a suction line 423, a fines slurry pump 424 and a recirculation line 425.

The pump 424 also supplies the net production of fines slurry through a line 426 to an eductor 427, which receives the ash particles separated in the disengaging zone 413 and the cyclone 416 via the standpipes 415 and 417. In the eductor 427 the ash particles, accompanied by some gas, are cooled, wetted, slurried and discharged through a line 428 to a fluidizing gas separator 429. In the separator 429 fluidizing gas is disengaged from the ash slurry and separated for venting, along with an equilibrium amount of steam, via a line 430, into the scrubber 422. (The latent heat of steam accompanying the gas in the line 430 represents heat recovered from hot ash.) The ash slurry is withdrawn via a bottom connection into a line 431 from which it flows to the hot side of an ash slurry-feedwater heat exchanger 432 in which it is cooled to a temperature suitable for discharge, through a pressure control device 433, to conventional ash slurry disposal.

Treated boiler feedwater enters the apparatus, under pressure from an offsite pump, via a line 434, and is preheated by indirect heat exchange with ash slurry in the exchanger 432. From the exchanger 432 it flows through a line 435 to a boiler feedwater accumulator 436 (which may be a "deaerator" of proprietary design). Gases liberated by the heating in the exchanger 432 are vented to the atmosphere from the top of the accumulator 436 through a pressure control device 437. A boiler feedwater pump 438 takes suction from the accumulator 436 and discharges feedwater through a line 439 to a series of spray nozzles arrayed across the upper cross-section of the scrubber 422. Spray nozzles may be disposed on a plurality of levels. The purpose of the water sprayed into the gas stream rising through the scrubber 422 is to cool it slightly below its dew point, condensing from it a small part of the steam it contains. Condensation of water on and around dust particles effectively wets them and removes them from the gaseous phase. In order to increase the liquid/gas ratio of the spray contact, spray water may be recirculated by means of an internal sump and circulation pump (not shown). Water from another suitable source may be substituted for feedwater.

As an alternative to the scrubbing system comprising the reheat exchanger 419, the scrubber 422, the contactor 421, the feedwater spray line 439, the mist extractor 440 and associated piping connections, another method of separating fine dust from hot fuel gas, such as a plurality of porous ceramic filter thimbles, may be employed.

Clean fuel gas leaves the scrubber 422 through a mist extractor 440 and flows to the cold side of the reheat exchanger 419, in which it is indirectly heated by hot fuel gas to an approach to its temperature. The reheated gas flows via a line 441 to a second-stage oxidation reactor 442, in which it is joined and mixed with the balance of the air discharged, via a line 443, from the compressor 408. In the reactor 442, which may be a simple modification of the reactor supplied by the turbine manufacturer for natural gas fuel, oxidation is completed in the presence of sufficient excess air to limit the temperature to that allowable in turbine specifications. The hot clean product gas is then conducted by a conduit 444 to the inlet of a gas turbine 445.

Gas evolved in a carbonization section, such as that illustrated in FIG. 1, and shown to be exiting via the line 124, may bypass the mixer 404 and the reactor 410 to join the clean fuel gas going to the reactor 442 (by means of connections not shown).

The hot product gas is partially expanded through the first-stage turbine 445, which delivers mechanical energy, in the form of shaft horsepower, to the second-stage air compressor 408. In order to maintain critical components of the turbine 445 within safe operating temperatures, high pressure steam, and/or air from the discharge of the compressor 408, may be supplied to internal cooling passages (through connections not shown).

Having been cooled by giving up energy in the turbine 445, the partially expanded gas flows via a crossover 446 to be expanded further in a second-stage turbine 447, which delivers mechanical energy, in the form of shaft horsepower, to the first-stage air compressor 406. Having been further cooled by giving up energy in the turbine 447, the further expanded gas flows via a crossover 448 to be expanded again in a third-stage turbine 449, which delivers mechanical energy, in the form of shaft horsepower, to a generator (or alternator) 450 which converts it into electricity which is delivered via conduit 451.

The pressure of the reactor 410 is determined by the discharge pressure capability of the compressor 408. The discharge pressure of the turbine 445 is adjusted so that it produces only as much power as consumed by the compressor 408. Similarly, the discharge pressure of the turbine 447 is adjusted so that it produces only as much power as consumed by the compressor 406, excess potential energy in the gas being transferred to the turbine 449 in the form of pressurized exhaust.

While FIG. 4 is illustrated by means of turbo-machinery supplied by a particular manufacturer, it can readily be adapted to turbo-machinery from other manufacturers having a different air discharge pressure and/or variations in the numbers of individual machines and their interrelationships.

The turbine 449 discharges into an exhaust manifold 452 which conducts the fully expanded product gas to a Heat Recovery Steam Generator (HRSG) 453. The HRSG 453 is a more-or-less standardized assembly of economizers, boilers and superheaters, designed for heat recovery from turbine exhaust and available from several manufacturers. As configured for this embodiment, the HRSG 453 comprises economizer, low, intermediate and high pressure boilers and superheaters for high and intermediate pressure steam. A number of other configurations are feasible alternatives, particularly as regards steam pressures, reheat coils and arrangement of economizer(s) and superheater(s).

Exhaust, from which economically useful heat has been recovered, is discharged to the atmosphere through a vent 454. Boiler feedwater is supplied to the HRSG 453 by the pump 438 by way of a line 455. Low pressure steam is delivered through a line 456 to offsite use. Superheated high pressure steam flows via a line 457 to the inlet of a condensing steam turbine 458. Superheated intermediate steam flows via a line 459 to an interstage of the turbine 458 appropriate for its pressure. Since the demand for low pressure steam is liable to be intermittent, a connection (not shown) may also be provided to convey excess low pressure steam to an appropriate stage of the turbine 458. The energy produced by the expansion of the high and intermediate pressure steam in the turbine 458 is transmitted, as shaft horsepower, to a generator (or alternator) 460 which converts it to electricity, which flows via a conduit 461 to join with that in the conduit 451. After diversion of a small amount to power internal services, such as lubricating oil pumps (through a conduit not shown), the net production of electricity is delivered from the apparatus through the conduit 462.

Fully expanded steam leaves the turbine 458 through a vacuum line 463 which conducts it to the hot side of a vacuum surface condenser 464. As shown, the heat necessary to condense the steam and create a vacuum is indirectly transferred to cooling water, supplied to the cold side of the condenser 464 by means of a line 465 and returned to an offsite cooling tower through a line 466. Alternatively, an air-cooled condenser could have been used in place of the water-cooled condenser 464. Steam condensate collects in the bottom of the condenser 464 from which it drains by gravity through a line 467 to a condensate receiver 468. An evacuation device 469, which may be a vacuum pump or steam jet ejector, is connected to the top of the receiver 468 in order to dispose to the atmosphere any non-condensible gas entering the condenser 464 with the steam exhausted from the turbine 458. From the receiver 468 steam condensate flows via a line 470 to a condensate pump 471, which gives it sufficient pressure to discharge into the accumulator 436.

Blowdown is cascaded from high pressure boiler to intermediate to low pressure and withdrawn from the HRSG 453 through a control device 472. The HRSG 453 may be equipped for firing with supplemental fuel (i.e., employ "duct burners") and can incorporate a coil in which to finish the heating of carbonaceous slurry to carbonization temperature.

If, in spite of the density separations and extractions performed during its preparation, the char slurry being charged to the reactor 410 contains toxic metals such that its ash might be rated as hazardous, the amount of primary oxidant mixed with the slurry in the mixer 404, and/or its oxygen concentration, may be increased so that the temperature reached in the upper part of the reactor 410 exceeds the fusion point of a majority of ash ingredients. Suspended ash particles then become small globules of molten slag. The subsequent injection of cooled clean fuel gas from the top of the scrubber, 422 by means of a line 473, a circulator 474 and a quench line 475, quenches the mix temperature to a level below the ash solidification point so that the ash separated from gas in the disengaging zone 413 and the cyclone 416 is in the form of roughly spherical, non-adherent particles.

Since, in order that the tubes of exchanger 419 may be constructed of metal, rather than ceramic, it is necessary for the quench to cool the fuel gas appreciably more than required to solidify slag globules, generally below 1800° F., a substantial recycle of fuel gas through the disengaging zone 413, the cyclone 416, the hot side of the exchanger 419 and the scrubber 422 may be entailed. The thermal capacity of the net clean fuel gas on the cold side of the exchanger 419 may be inadequate for this duty. Up to a point additional cooling duty can be shifted to an exchanger (not shown but similar to the exchanger 545 of FIG. 5), preheating char slurry or boiler feedwater, interposed in the line 425. But, it may also be necessary to supplement such hot fuel gas cooling duty by means of an exchanger or waste heat boiler (not shown) in parallel or series with the exchanger 419, transferring part of it to, for example, boiler feedwater.

It is also possible to perform part or all of the quenching of the hot gas-slag globules mixture with water injected above the disengaging zone 413 (by means of a line not shown).

In the event that oxygen or enriched air is supplied to the mixer 404 from an air separation unit having its own charge air compressor, the line 409 may be omitted, all of the air discharged by the compressor 408 being delivered to the line 443 and the second'stage reactor 442.

Although diagrammed as a single connection, cooled gas (or water) may actually be injected into the reactor 410 through a plurality of connections around its circumference and located in more than one horizontal plane.

Not shown in FIG. 4 are auxiliary systems and equipment, such as those needed to bring the apparatus on stream from a cold start, back-up fuel and power, blowdown and pressure relief systems.

The embodiment of FIG. 5 also incorporates the embodiment of FIG. 1 and the conversion of the high energy density char slurry to high pressure superheated and medium pressure steam, which may be converted to electricity in an off-site conventional condensing turbo-generator and/or used for other site purposes. Slurry water is inherently distilled, becoming a useful byproduct. The concentrated or re-slurried char slurry enters the apparatus, preferably at the temperature at which it was produced, through a line 501. A reactor charge pump 502 gives it sufficient pressure to cause it to flow through a line 503 to the cold side of an ash slurry-char slurry heat exchanger 504 and through a line 505 to a circulating fluidized bed reactor 506.

Gas evolved in a carbonization section, such as that illustrated in FIG. 1, and shown to be exiting via the line 124, may also be introduced to the lower part of the reactor 506 (by means of connections not shown). Atmospheric air is drawn through a conduit 507, in which may be located a conventional dust filter (not shown), to the suction of a first stage air compressor 508, which delivers it hot and at an elevated pressure through a line 509 to the hot side of an intercooler 510, in which it is cooled by indirect exchange with high pressure boiler feedwater. Atmospheric air contains a variable amount of water vapor (humidity). Most of the water vapor carried by the air condenses to liquid water in the intercooler 510 and is discharged with the cooled air into a line 511. This water is separated from the air in a second stage compressor suction drum 512 and a mist extractor 513 and removed from the apparatus through a level control device 514.

From the mist extractor 513 the partially compressed air flows to the suction of a second-stage air compressor 516, which delivers it hot and at a further increased pressure to a line 517. The line 517 supplies primary air through a line 518 to the bottom of the reactor 506. Since staged air introduction is a known means of minimizing nitrogen oxides formation, primary air may be considerably less than theoretically required for complete oxidation of the char in the slurry charged, the remainder of the air discharged by the compressor 516 being added through reactor connections at successively higher elevations as illustrated by a line 519.

The temperature in the inlet zone of the reactor 506 is such that the fuel slurry water immediately vaporizes so that char and ash particles become entrained in the upflowing air and water vapor, along with a quantity of hot recycled solids. Oxidation of char particles is initiated and proceeds rapidly as the gas-solids mixture flows at relatively high, turbulent flow velocity through the reactor 506. Heat liberated by the oxidation causes the temperature to rise but heat indirectly transferred to boiling feedwater in a ring of vertical boiler tubes lining the inside circumference of the reactor 506, along with the heat capacity of circulated solids, limits the rise so that a predetermined maximum temperature is not exceeded.

The boiler tubes (not shown) are supplied with hot feedwater by a feedwater manifold 520 and discharge a mixture of feedwater and steam into an outlet manifold 521.

Upon reaching the top of the reactor, the gas-solids mixture, from which most of the carbon has been oxidized, exits through a crossover 522 to a hot cyclone separator 523. In the separator 523 centrifugal force causes most of the solid particles to separate from gaseous products and fall by gravity into a standpipe 524. Solids flow down the standpipe 524 in relatively dense phase, producing, by their weight, a pressure at the bottom somewhat above that existing at a similar level of the reactor 506. This pressure differential causes all or a major portion of the solid particles to flow, via a seal or trap 525, as a hot solids recycle, to the inlet zone of the reactor 506, where it mixes with and heats incoming air and char slurry. The standpipe 524 and the seal 525 may be equipped with aeration connections (not shown).

While not illustrated in this embodiment, solids circulation may be assisted by an eduction device, utilizing the kinetic energy of oxidation air and/or vaporizing slurry water, a version of which is illustrated in FIG. 2 of U.S. Pat. No. 4,714,032. Features of other variations of the circulating fluidized bed principle may also be used, including those extracting heat from the dense solids recirculated via the cyclone separator and the standpipe.

Some of the chars envisaged in this invention may contain insufficient ash to accumulate a solids recycle in the reactor 506, and/or the ash may be so fine, or attrit to an extent that insufficient is retained by the cyclone 523. It is quite permissible, in such case, to augment the circulated solids with extraneous inert particles of suitable size range and resistance to attrition. It may, in any case, be useful to provide an initial charge of such material so that there will be sufficient inventory of recycle for start-up.

High pressure steam and feedwater from the outlet manifold 521 flow to a high pressure steam drum 526 in which the water separates and flows by gravity through a downcomer 527 as recycle feedwater to the inlet manifold 520. The separated steam flows upward and exits the drum 526 through a mist extractor 528, continuing on to a steam superheat exchanger 529 in which it is superheated to the temperature at which it will be delivered from the apparatus through a line 530 as the main energy product.

Product gas, carrying fine solid particles unseparated by the cyclone 523, leaves the reaction system by means of a manifold 531, which may contain a second-stage cyclone, porous ceramic filters or other device (not shown) for separating fine solids from gases. The manifold 531 supplies the hot gas as heating media, via a line 532 to the steam superheat exchanger 529, and via a line 533 to a secondary first-stage flue gas reheat exchanger 535 and via a line 534 to a second-stage flue gas reheat exchanger 536. Having been partially cooled by indirect heat transfer in the exchangers 529, 535 and 536, product gases are recombined in a manifold 537 and flow to a primary first-stage flue gas reheat exchanger 538, in which they are cooled to a temperature approaching their dew point.

Depending upon individual heat balance, there may be more sensible heat in the hot product gases leaving the reaction system than required for the proper functioning of the exchangers 529, 535, 536 and 538. In such case, a trim waste heat boiler may be inserted in the line 531 or the manifold 537, supplementing the production of high or medium pressure steam.

Cooled product gas flows, via a line 539, to a contacting device 540 in which it is cooled to its dew point and has entrained dust particles wetted by contact with fines slurry recirculated from the base of a vent gas dehydrator tower 541, by means of a suction line 542, a fines slurry pump 543 a recirculation line 544, a fines slurry-feedwater exchanger 545 and a return line 546. The device 540 discharges into a flash zone 547 of the tower 541, in which a separation occurs between the product gas, which flows upward, and the slurry, which falls to the base of the tower 541.

The pump 543 also supplies the net production of fines slurry through a line 548 to an ash eductor 549, which receives the net production of ash particles from the reactor 506 via a bottom standpipe 550. In the eductor 549 the ash particles, accompanied by some gas, are cooled, wetted, slurried and discharged through a line 551 to a fluidizing gas separator 552. In the separator 552 fluidizing gas is disengaged from the ash slurry and separated for venting, along with an equilibrium amount of steam, via a line 553, into the tower 541. (The latent heat of steam accompanying the gas in the line 553 represents heat recovered from hot ash.) The ash slurry is withdrawn via a bottom connection into a line 554 from which it flows to the hot side of the ash slurry-char slurry heat exchanger 504, in which it is cooled to a temperature suitable for discharge, through a pressure control device 555, to conventional ash slurry disposal. In case the char slurry charged to the apparatus is too hot to adequately cool the ash slurry, the cooling may be supplemented by exchange with boiler feedwater in a heat exchanger (not shown).

The gas flowing upward from the flash zone 547 is washed to remove entrainment in one or more countercurrent vapor-liquid contacting elements 556 before rising through an axial passage in a hot water sump 557, which supplies wash water to the elements 556 through a flow control device 558, and hot water to a circulating pump 559, which discharges it through the hot side of a waste heat boiler 560, which indirectly cools it for return through a line 561 as circulating reflux to the uppermost of a plurality of countercurrent vapor-liquid contacting elements 562 in the mid-section of the tower 541. The partially cooled water flowing downward through the elements 562 cools upflowing gas and condense steam from it, becoming reheated in the process before collecting in the sump 557.

Heat transferred from the circulating hot water in the boiler 560 vaporizes part of the feedwater supplied to the cold side of the boiler 560 by a line 563. Steam and water exit the cold side of the boiler 560 via a line 564 and are separated into their respective phases in a medium pressure steam drum 565, from the bottom of which unvaporized feedwater recirculates through a line 566 to the inlet of the cold side of the boiler 560. Steam separated in the drum 565 exits through a mist extractor 567 and leaves the apparatus as a secondary energy product via a line 568.

Because of the steam condensed from the gas stream in the mid-section of the tower 541 there is a net production of water which is discharged through a level control device 569 into a similar circulating system in the upper section of the tower 541. Partially cooled and dehydrated by circulating water in the mid-section of the tower 541, the gas, still carrying an appreciable portion its former steam content, rises through an axial passage in an upper sump 570, which supplies warm water to a circulating pump 571, which discharges it through the hot side of a feedwater preheat exchanger 572, in which it is cooled for return through a line 573 as circulating reflux to the uppermost of a plurality of countercurrent vapor-liquid contacting elements 574, in the upper section of the tower 541. The cooled water flows downward through the elements 574, further cooling the upflowing gas and condensing from it most of the steam it contained when entering the section. The net water condensed in the mid and upper sections of the tower 541 are discharged through a level control device 575 as a product of the embodiment. Except for a minor content of dissolved gases it is high quality water, low in dissolved solids.

Heat transferred from the circulating warm water in the exchanger 572 preheats medium pressure boiler feedwater entering the apparatus from offsite via a line 576 and routes it through a line 577 to a medium pressure feedwater accumulator 578 (which may be a "deaerator" of proprietary design). Gases liberated by the heating in the exchanger 572 are separated in the accumulator 578 and discharged through a control device 579. From the accumulator 578 deaerated medium pressure feedwater flows via a line 580 to the suction of a medium pressure boiler feedwater pump 581 which discharges it as make-up into the circulating system of the boiler 560.

As illustrated, the vent gas dehydrator tower 541 has three sections. Depending upon individual heat balance and economic factors, one or more additional sections may be justified, with the result that recovered sensible and latent heat are made available with less loss of temperature. Heat in water circulating through additional sections would be used, for example, to generate steam at another pressure level or to increase the preheat of boiler feedwater.

High pressure boiler feedwater enters the apparatus under pressure of an offsite pump via a line 582, which conducts it to the cold side of the intercooler 510 in which it is indirectly heated by hot compressed air. Leaving the intercooler 510 through a line 583 the partially heated feedwater flows through the cold side of the fines slurry-feedwater exchanger 545, in which it is indirectly heated by hot fines slurry. The heated feedwater continues via a line 584 to a high pressure boiler feedwater accumulator 585 (which may be a "deaerator" of proprietary design). Gases liberated by the heating in the exchangers 510 and 545 are separated in the accumulator 585 and discharged through a control device 586. From the accumulator 585 deaerated high pressure feedwater flows via a line 587 to the suction of a high pressure boiler feedwater pump 588, which discharges it as make-up into the circulating system of the high pressure boiler loop.

Clean, dehydrated product gas leaves the tower 541 through a mist extractor 590 and is reheated indirectly by partially cooled product gas in the exchanger 538, then proceeds via a line 591 to the cold side of the exchanger 535 in which it is indirectly heated by, and to an approach to the temperature of, hot product gas. The fully reheated clean, dehydrated gas is then conducted via a line 592 to the inlet of a first-stage gas turbine 593, which delivers energy, in the form of shaft horsepower, to the second-stage air compressor 516. Having been cooled by giving up energy in the turbine 593, the partially expanded gas flows via a line 594 to the cold side of the exchanger 536, in which it is indirectly reheated by, and to an approach to the temperature of, a parallel stream of hot product gas from the line 534. The reheated clean gas then flows via a line 595 to be fully expanded through a second-stage turbine 596, which delivers mechanical energy, in the form of shaft horsepower, to the first-stage air compressor 508. Having been cooled by giving up energy in the turbine 596, the fully expanded gas is discharged to the atmosphere through a vent 597. In some cases the sensible heat remaining in the gas discharged from the turbine 596 may justify the inclusion of an economizer exchanger in the vent line 597, to preheat medium or high pressure feedwater.

FIG. 5 illustrates a limiting case in that dehydrated gas is reheated only to a temperature sufficient to provide, upon expansion, enough power to drive the air compressors, whereas FIGS. 2–4, incl. illustrate embodiments in which the gas being expanded is hot enough to produce excess horsepower, over that required to compress the air, which excess is converted to electricity. The embodiment of FIG. 5 could not produce as much excess gas turbine horsepower as the cited embodiments but it is feasible, in some cases, for one or both turbines of FIG. 5 to produce a modest excess, convertible into electricity.

As illustrated, the turbines and compressors of FIG. 5 are configured as separate, custom manufactured machines, which has the advantage that the pressure level of the reactor 506 may be chosen on the basis of overall process economics. Since such machines are not necesarily available for identical rotating speeds, it is permissible for the shafts between one or both sets of machines to be equipped with gearing for speed adjustment. In some cases, on the other hand, it may be more economical to adjust this pressure to the capabilities of catalog turbo-machinery and/or gas turbines.

Although FIG. 5 shows a first-stage turbine driving a first-stage compressor and a second-stage turbine driving a second-stage compressor, the services of first- and second-stage turbines could be reversed.

Not shown in FIG. 5 are auxiliary systems and equipment, such as those needed to bring the apparatus on stream from a cold start, back-up fuel and power, blowdown and pressure relief systems.

DESCRIPTION OF THE INVENTION

Physical separation of dense inorganic impurities from a low quality fuel will usually be accomplished by known methods. For example, there is extensive art concerning hydraulic coal cleaning and beneficiation, including froth flotation. In the case of MSW, U.S. Pat. No. 4,624,417 (Gangi) describes a suitable method of slurrying and of separating debris, iron, glass and nonferrous metals (wet Resource Recovery), including preliminary concentration of carbonaceous slurry to a suitable viscosity.

In a Technical Report to the Illinois Clean Coal Institute (ICCI) for the second quarter of 1983, "Behavior of Sulfur and Chlorine in Coal During Combustion and Boiler Corrosion", the authors report to the ICCI that, in a coal sample containing 0.42% on a dry basis, "most of the chlorine occurs as chloride ions adsorbed on inner walls of the pores" and, in "Characterization of Available Coals from Illinois Mines", only about 0.12% can be extracted with water, ammonia and sodium hydroxide. The structural rearrangement which occurs at the conditions claimed herewith for slurry carbonization is expected to free nearly all of the chlorine unavailable by atmospheric pressure extraction (as well as to increase the pumpable energy density and decrease the content of other soluble, or difficultly soluble, impurities).

Portions of a sample of wet-processed RDF, containing 0.41% chlorine (dry basis) from Reno, N.V., and MSW were ground through plates with ¼ holes (Tests 1 and 2) and portions through ⅛-inch holes (Tests 3 and 4). Approximately 460 grams of each grind were slurried in approximately 2540 grams of water and subjected to carbonization at temperatures of 572° F. (Tests 1 and 3) and 617° (Tests 2 and 4) and saturation pressure. The yield of dry char solids was about 80% and contained (Tests 1–4, resp.) 0.05, 0.14, 0.02, and 0.07% chlorine. Thus, under the best of these conditions, 94% of the chlorine was removed. These tests were made without alkali addition, which is expected to improve chlorine extraction still further.

What is claimed is:

1. A continuously operable method of utilizing the energy of a relatively low-grade carbonaceous fuel having a fuel value comprising the steps of:

providing the fuel in a slurry;

pressurizing the slurry to keep it substantially in its liquid state;

heating the pressurized slurry to a temperature at which a substantial portion of oxygen chemically bound in molecules of the carbonaceous fuel splits off as carbon dioxide, thereby forming a char slurry including char particles derived from the fuel and an evolved gas;

reacting the char particles with a gas including oxygen to thereby convert the fuel value of the char particles of the slurry into thermal energy; and using the thermal energy.

2. A process according to claim 1 wherein the step of reacting comprises the step of reacting the char particles at a temperature which is initially below an ignition temperature for the particles.

3. A method according to claim 1 wherein the slurry and the char slurry each include water, and including the step of lowering the amount of water in the char slurry as compared to the amount of water in the pressurized slurry.

4. A method according to claim 1 wherein the slurry includes halogens, and including the step of adjusting an alkali content of the slurry to at least equal the chemical equivalent of the halogen content so that soluble halogen salts are formed during the heating step.

5. A method according to claim 4 wherein the adjusting step comprises the step of adding alkali to the slurry.

6. A method according to claim 4 including the step of separating the char particles from a remainder of the char slurry including the halogen salts.

7. A method according to claim 6 including the step of adding substantially halogen-free water to the char particles which were separated from the remainder of the slurry to thereby form the char slurry.

8. A method according to claim 7 wherein the step of adding water comprises the step of adding a lesser amount of water to the char particles than the amount of water removed from the char particles during the separating step.

9. A method according to claim 2 wherein the step of providing comprises the steps of furnishing solid waste; shredding the waste; mixing the waste with water to form a waste slurry; pulping the waste slurry; subjecting the waste slurry to a density separation to remove from the waste slurry debris, metals and glass which may be present in the waste slurry; and thereafter removing a portion of the water from the waste slurry to form the carbonaceous fuel slurry.

10. A method according to claim 2 wherein the step of providing comprises the steps of furnishing a solid fossil fuel, grinding the solid fossil fuel, subjecting the solid fossil fuel to benificiation to partially remove noncombustible matter therefrom, and forming the slurry with the solid fossil fuel.

11. A method according to claim 2 wherein the step of providing comprises the step of furnishing at least one of forestry waste and agricultural waste as the carbonaceous fuel, reducing the waste in size into relatively small waste particles, and suspending the small waste particles in water to thereby form the slurry.

12. A method according to claim 2 wherein the step of providing comprises the step of furnishing a low-grade carbonaceous fuel including cations, entraining the fuel in water to form the slurry, and providing the slurry with an agent promoting the dissolution of the cations.

13. A method according to claim 12 wherein the step of providing the slurry with an agent comprises providing the slurry with at least one of an acid and a chelating agent.

14. A method according to claim 1 wherein the step of reacting comprises the steps of reacting the char particles in a pressurized reactor to produce a hot product gas and removing solids, including fine solids from the hot product gas, and wherein the using step comprises utilizing the hot product gas in a gas turbine to produce mechanical energy.

15. A method according to claim 14 wherein the step of reacting comprises the step of reacting the char particles at a temperature which reaches between about 1600° F. to about 2600° F.

16. A method according to claim 14 wherein the step of reacting comprises the step of intimately mixing the char slurry with the gas including oxygen and reacting the char particles therewith to form a hot product gas including entrained solid particles, separating the entrained solid particles from the hot product gas, and driving the turbine with the hot product gas.

17. A method according to claim 16 wherein the step of reacting to form the hot product gas takes place at a temperature which reaches between about 900° F. to about 1600° F.

18. A method according to claim 16 in which the step of reacting the product to form the hot product gas is performed in a fluidized bed reactor having a circulating fluidized bed of solid particles.

19. A method according to claim 18 wherein the reactor includes a bottom portion, a top portion and an upflowing reaction zone therebetween, and wherein the step of reacting to form the hot product gas includes the steps of admitting a part of the gas including oxygen into the bottom portion of the reactor and introducing the char slurry into the reactor at a point above the bottom portion of the reactor.

20. A method according to claim 14 including the step of furnishing a heat recovery steam generator for generating steam, directing the product gas discharged by the turbine to the generator to generate steam therewith, and injecting at least a portion of the generated steam into the hot product gas before it is fed to the turbine to thereby augment the amount of mechanical energy produced by it.

21. A method according to claim 14 including the step of furnishing a heat recovery steam generator, directing gas discharged by the turbine to the steam generator and generating steam therewith in the generator, and driving a steam turbine with the generated steam to produce mechanical energy therewith.

22. A method according to claim 14 including the steps of cooling the hot product gas to a temperature approaching its dew point, thereafter directing the hot product gas to a water scrubber, in the water scrubber cooling the hot product gas to below its dew point and condensing a portion of the steam in the hot product gas onto solids entrained in the gas to thereby wet the solids, separating the wetted solids from the hot product gas and forming a fines slurry with them, and reheating the remaining hot product gas to a temperature approaching the temperature of the hot product gas prior to the cooling step.

23. A method according to claim 1 including the step of separating the evolved gas from the char slurry.

24. A method according to claim 14 wherein the step of removing includes the steps of furnishing a separating device comprising a plurality of ceramic thimbles, passing the hot product gas past the thimbles so that particulates are retained on surfaces of the thimbles facing in an upstream direction, and intermittently backflowing a gas past the thimbles to thereby dislodge accumulated solid particles from the upstream-facing surfaces thereof.

25. A method according to claim 24 wherein the ceramic thimbles are porous, and wherein the step of passing the hot product gas past the thimbles comprises the step of at least partially flowing the hot product gas through the porous ceramic thimbles.

26. A method according to claim 16 wherein the step of reacting the char particles includes the steps of adjusting the amount of oxygen in the gas including oxygen which is mixed with the slurry so that the subsequent reacting step to form the hot fuel gas occurs at a temperature above a melting point temperature of a majority of the solid particles entrained in the hot fuel gas to thereby melt the entrained particles, and thereafter lowering the temperature of the melted particles below a solidification temperature for the particles so that the particles in the hot fuel gas are entrained therein in the form of vitrified particles.

27. A method according to claim 26 wherein the temperature during the reacting step to form the hot fuel gas is in the range of between 2200° F. to 2900° F.

28. A method according to claim 26 wherein the step of cooling comprises the steps of cooling at least a portion of the clean gas and adding said portion of the clean gas to the hot fuel gas to thereby solidify the melted particles.

29. A method according to claim 16 wherein the step of mixing the slurry with a portion of the gas including oxygen includes the step of adjusting an amount of gas including oxygen admixed with the slurry so that the hot fuel gas has a temperature above a melting point for a majority of entrained solid particles to thereby melt the particles, and lowering the temperature of the melted particles to below their solidification temperature to thereby entrain vitrified solid particles in the hot fuel gas.

30. A method according to claim 29 wherein the step of adjusting comprises the step of adjusting the amount of gas including oxygen added to the char slurry so that the temperature of the hot fuel gas is in the range between about 2200° F. and about 2900° F.

31. A method according to claim 14 wherein the step of reacting the char particles includes the step of reacting the char slurry in a primary reaction stage with an amount of gas including oxygen selected so that the temperature of the hot product gas exceeds a melting point of a majority of the solids in the product gas, whereby the solids are entrained in the product gas as melted globules, and thereafter solidifying the globules into vitrified particles by adding a sufficient amount of gas including oxygen to lower the temperature of the hot product gas below the solidification temperature for the globules.

32. A method according to claim 29 wherein the step of cooling comprises the step of adding the remainder of the gas including oxygen.

33. A method according to claim 31 wherein the removing step comprises passing the hot fuel gas through a water scrubber to form a clean gas, and wherein the step of solidifying comprises admixing clean gas withdrawn from the water scrubber with the hot fuel gas including melted globules to solidify the globules into vitrified particles entrained in the hot product gas.

34. A method according to claim 16 wherein the step of mixing the char slurry with a portion of the gas including oxygen includes the step of adjusting a concentration of oxygen in the gas including oxygen admixed with the char slurry so that the hot fuel gas has a temperature above a melting point for a majority of the entrained solid particles to thereby melt the particles, and lowering the temperature of the melted particles to below their solidification temperature to thereby entrain vitrified solid particles in the hot fuel gas.

35. A method according to claim 20 including the step of diverting another portion of the generated steam directly to the turbine.

36. A method according to claim 20 including the step of diverting another portion of the steam and using the thermal energy therein other than for driving the turbine.

37. A method according to claim 1 wherein the step of providing the fuel in a slurry comprises the steps of forming a slurry comprising coal and another relatively low-grade carbonaceous fuel.

38. A method according to claim 4 wherein the step of adjusting an alkali content of the slurry comprises adjusting the alkali content of the slurry to less than the chemical equivalent of the halogen content.

39. A method according to claim 6 including the steps of washing the char particles removed from the char slurry with clean water and thereafter reslurrying the washed char particles with clean water.

40. A method according to claim 6 including the step of grinding at least a portion of the separated char particles.

41. A method according to claim 1 including the step of separating by density inorganic particles freed during the heating step.

42. A method adapted for continuously utilizing energy from a relatively low-grade carbonaceous fuel having a fuel value and which includes halogens, the method comprising the steps of:

suspending the fuel in water to form a slurry;

adjusting an alkali content of the slurry so that it is at least about equal to a chemical equivalent of the halogen content in the slurry;

pressurizing the slurry to maintain it in a substantially liquid phase;

heating the slurry while pressurized to a temperature at which a substantial portion of oxygen chemically bound in molecules of the carbonaceous fuel separates therefrom as carbon dioxide, thereby forming a slurry including char particles and dissolved halogen salts;

segregating the char particles from the slurry and the halogen salts dissolved therein;

adding a controlled amount of substantially halogen-free water to the char particles to form a relatively high-energy density, halogen-reduced char slurry;

reacting the char particles in the char slurry with a gas including oxygen at a temperature which is initially lower than an ignition temperature for the char particles to thereby convert the fuel value of the char slurry into thermal energy; and using the thermal energy.

43. A method for continuously operating a gas turbine with a clean, hot gas obtained from a low-grade carbonaceous fuel including moisture and halogens, the method comprising the steps of:

providing a fuel slurry including water and the carbonaceous fuel suspended therein;

adjusting an alkali content of the slurry so that it is at least about equal to a chemical equivalent of the halogen content of the slurry;

pressurizing the slurry to maintain it in a substantially liquid state;

heating the slurry while pressurized to a temperature sufficient to remove from the fuel at least a substantial portion of oxygen chemically bound in molecules of the fuel as carbon dioxide and to also form char particles from the fuel, soluble halogen salts from the halogens and an evolved gas;

separating the evolved gas from the slurry, the char particles and the dissolved halogen salts;

segregating the char particles from the water including the dissolved halogen salts;

reslurrying the char particles in a controlled amount of halogen-free water to form a high-energy density, halogen-reduced char slurry;

pressurizing the char slurry;

pressurizing a gas including oxygen;

mixing the char slurry and the oxygen including gas in an inlet zone of an elongated oxidation reactor;

oxidizing the char particles under pressure in the presence of steam and maintaining the char slurry-gas mixture at a temperature in the range of between about 1600° F. to about 2900° F. to thereby form a product gas including steam and solid particulates;

removing the particulates from the product gas to form a clean gas-steam mixture and particulates removed therefrom; and driving the gas turbine with the gas-steam mixture.

44. A method for continuously operating a gas turbine with a clean, hot gas obtained from a low-grade carbonaceous fuel including moisture and halogens, the method comprising the steps of:

providing a fuel slurry including water and the carbonaceous fuel entrained therein;

adjusting an alkali content of the slurry so that it is at least about equal to a chemical equivalent of the halogen content of the slurry;

pressurizing the slurry to maintain it in a substantially liquid state;

heating the slurry while pressurized to a temperature sufficient to remove from the fuel at least a substantial portion of oxygen chemically bound in molecules of the fuel as carbon dioxide and to also form char particles from the fuel, soluble halogen salts from the halogens and an evolved gas;

separating the evolved gas from the slurry, the char particles and the dissolved halogen salts;

segregating the char particles from the water including the dissolved halogen salts;

reslurrying the char particles in a controlled amount of halogen-free water to form a high-energy density, halogen-reduced char slurry;

pressurizing the char slurry;

pressurizing a gas including oxygen;

mixing the char slurry and the oxygen including gas in an inlet zone of an elongated oxidation reactor;

oxidizing the char particles under pressure and in the presence of steam to thereby form a hot product gas including steam and solids;

extracting a portion of the heat energy in the hot product gas at substantially the same pressure as prevailed during the oxidation step;

removing solids from the product gas to form a clean gas-steam mixture; and driving the gas turbine with the gas-steam mixture.

45. A method according to claim 44 wherein the step of removing the solids from the product gas comprises the steps of:

cooling the product gas by indirect heat exchange to a temperature approaching a dew point temperature for the product gas;

further cooling the product gas below its dew point temperature by contacting it with water and condensing a portion of the steam in the product gas on solid particles entrained therein to remove the solid particles in the form of an ash slurry from the product gas;

thereafter further indirectly cooling the product gas to a temperature at which a preponderance of its steam condenses to recover latent heat of the char slurry water at a useful temperature and forming a dehydrated product gas;

reheating the dehydrated product gas by indirect heat exchange with hot product gas; and driving the gas turbine with the reheated, dehydrated product gas.

* * * * *